(12) United States Patent
Matsuura

(10) Patent No.: US 7,844,109 B2
(45) Date of Patent: Nov. 30, 2010

(54) IMAGE PROCESSING METHOD AND APPARATUS

(75) Inventor: Takahiro Matsuura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 839 days.

(21) Appl. No.: 10/943,866

(22) Filed: Sep. 20, 2004

(65) Prior Publication Data

US 2005/0063585 A1    Mar. 24, 2005

(30) Foreign Application Priority Data

Sep. 24, 2003 (JP) .............................. 2003-331845
Apr. 5, 2004 (JP) .............................. 2004-111034

(51) Int. Cl.
*G06K 9/00* (2006.01)
*H04N 17/00* (2006.01)
*H04N 9/73* (2006.01)

(52) U.S. Cl. .................... 382/167; 382/162; 348/187; 348/188; 348/223.1

(58) Field of Classification Search ................ 348/187, 348/188, 223.1; 382/162, 167
See application file for complete search history.

(56) References Cited

U.S. PATENT DOCUMENTS

| | | | | |
|---|---|---|---|---|
| 5,268,754 A * | 12/1993 | Van de Capelle et al. | ... | 358/527 |
| 5,416,890 A * | 5/1995 | Beretta | ......................... | 345/590 |
| 5,627,950 A * | 5/1997 | Stokes | ......................... | 345/591 |
| 5,668,596 A * | 9/1997 | Vogel | ...................... | 348/222.1 |
| 5,781,206 A * | 7/1998 | Edge | ........................... | 347/19 |
| 5,805,213 A * | 9/1998 | Spaulding et al. | ......... | 348/222.1 |
| 5,982,416 A | 11/1999 | Ishii et al. | ..................... | 348/29 |
| 6,256,062 B1 * | 7/2001 | Endo | ....................... | 348/223.1 |
| 6,493,468 B1 | 12/2002 | Matsuura | ................... | 382/274 |
| 6,636,260 B2 | 10/2003 | Kiyokawa | ................ | 348/222.1 |
| 6,642,930 B1 | 11/2003 | Matsuura et al. | ............ | 345/601 |
| 6,734,899 B1 * | 5/2004 | Okamoto | ..................... | 348/188 |
| 7,414,633 B2 * | 8/2008 | Sato et al. | .................... | 345/601 |
| 2001/0033387 A1 * | 10/2001 | Nogiwa et al. | ................ | 358/1.9 |
| 2002/0145744 A1 * | 10/2002 | Kumada et al. | .............. | 358/1.9 |
| 2003/0048464 A1 * | 3/2003 | Yamada et al. | ............... | 358/1.9 |
| 2003/0103671 A1 | 6/2003 | Matsuura | ..................... | 382/173 |
| 2003/0112334 A1 | 6/2003 | Kiyokawa | ................ | 348/207.1 |
| 2003/0142110 A1 * | 7/2003 | Murashita | ................... | 345/600 |
| 2003/0184557 A1 * | 10/2003 | Wen | ........................... | 345/590 |

FOREIGN PATENT DOCUMENTS

| | | |
|---|---|---|
| JP | 11-355586 | 12/1999 |
| JP | 2000-13628 | 1/2000 |
| JP | 2001-238222 | 8/2001 |
| JP | 2003-244458 | 8/2003 |
| JP | 2003-299115 | 10/2003 |

* cited by examiner

*Primary Examiner*—Matthew C Bella
*Assistant Examiner*—Michael A Newman
(74) *Attorney, Agent, or Firm*—Fitzpatrick, Cella, Harper & Scinto

(57) ABSTRACT

In order to allow a user to arbitrarily set color processing parameters which determine the color reproduction characteristics of a digital camera according to user's preference, an image processing unit obtains color data by performing the same processing as that performed by the digital camera with respect to the sensed data of each color patch included in a color chart by using color processing parameters. A changing unit displays, on a display unit, a target data changing window which presents color data and the target data (the target color of color reproduction) of each color patch and allows the user to change the target data. A parameter editing unit edits color processing parameters so as to reduce the color difference between the changed target data and color data. A data input/output unit transmits the edited color processing parameters to the digital camera.

7 Claims, 37 Drawing Sheets

FIG. 5

| ID | TARGET DATA | | EDITED INPUT DATA | wi | Ei | HUE ANGLE |
|---|---|---|---|---|---|---|
| 0 | (XX.XX, XX.XX, XX.XX.) | ↑ | (XX.XX, XX.XX, XX.XX.) | 1 | 4.41 | 358.42 |
| 1 | (XX.XX, XX.XX, XX.XX.) | ↑ | (XX.XX, XX.XX, XX.XX.) | 1 | 4.55 | 333.40 |
| 2 | (XX.XX, XX.XX, XX.XX.) | ↑ | (XX.XX, XX.XX, XX.XX.) | 1 | 3.55 | 320.89 |
| 3 | (XX.XX, XX.XX, XX.XX.) | ↑ | (XX.XX, XX.XX, XX.XX.) | 1 | 3.86 | 310.11 |
| 4 | (XX.XX, XX.XX, XX.XX.) | ↑ | (XX.XX, XX.XX, XX.XX.) | 1 | 2.80 | 298.47 |
| 5 | (XX.XX, XX.XX, XX.XX.) | ↑ | (XX.XX, XX.XX, XX.XX.) | 1 | 5.35 | 230.78 |
| 6 | (XX.XX, XX.XX, XX.XX.) | ↑ | (XX.XX, XX.XX, XX.XX.) | 1 | 3.77 | 204.99 |
| 7 | (XX.XX, XX.XX, XX.XX.) | ↑ | (XX.XX, XX.XX, XX.XX.) | 1 | 4.87 | 185.53 |
| 8 | (XX.XX, XX.XX, XX.XX.) | ↑ | (XX.XX, XX.XX, XX.XX.) | 1 | 4.14 | 167.02 |
| 9 | (XX.XX, XX.XX, XX.XX.) | ↑ | (XX.XX, XX.XX, XX.XX.) | 1 | 8.06 | 152.11 |
| 10 | (XX.XX, XX.XX, XX.XX.) | ↑ | (XX.XX, XX.XX, XX.XX.) | 1 | 4.93 | 12.95 |
| 11 | (XX.XX, XX.XX, XX.XX.) | ↑ | (XX.XX, XX.XX, XX.XX.) | 1 | 1.24 | 42.47 |
| 12 | (XX.XX, XX.XX, XX.XX.) | ↑ | (XX.XX, XX.XX, XX.XX.) | 1 | 6.48 | 128.50 |
| 13 | (XX.XX, XX.XX, XX.XX.) | ↑ | (XX.XX, XX.XX, XX.XX.) | 1 | 6.33 | 316.34 |
| 14 | (XX.XX, XX.XX, XX.XX.) | ↑ | (XX.XX, XX.XX, XX.XX.) | 1 | 4.23 | 138.46 |
| 15 | (XX.XX, XX.XX, XX.XX.) | ↑ | (XX.XX, XX.XX, XX.XX.) | 1 | 10.93 | 23.06 |
| ... | | | | | | ... |

EVALUATION FUNCTION E : 3.28

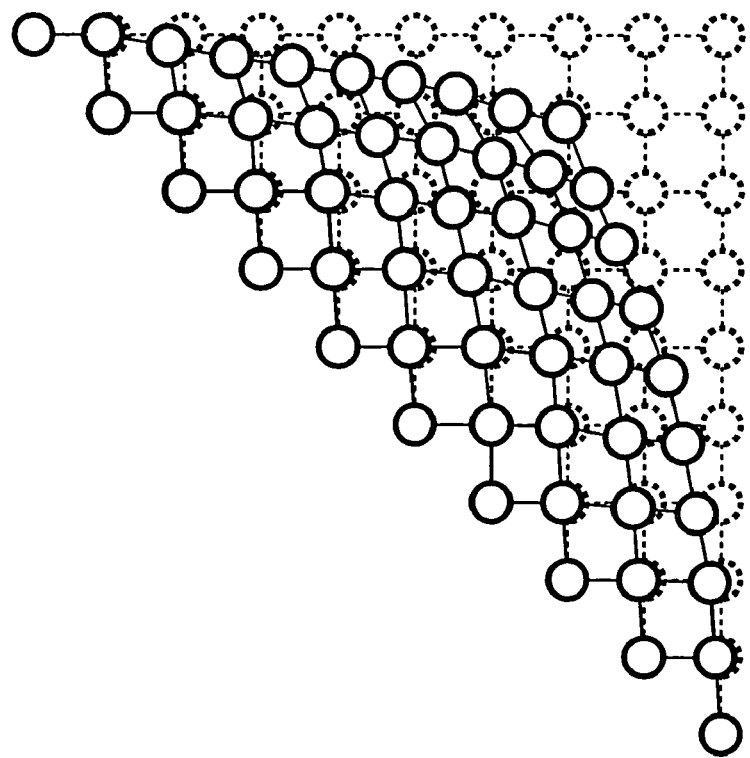
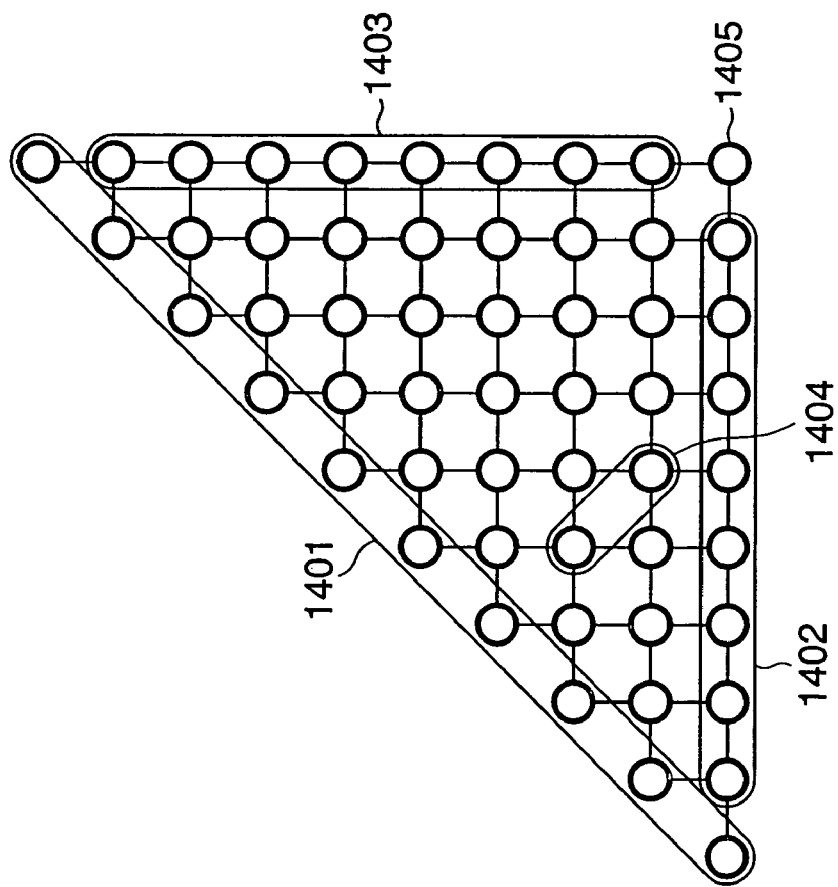

F I G. 24
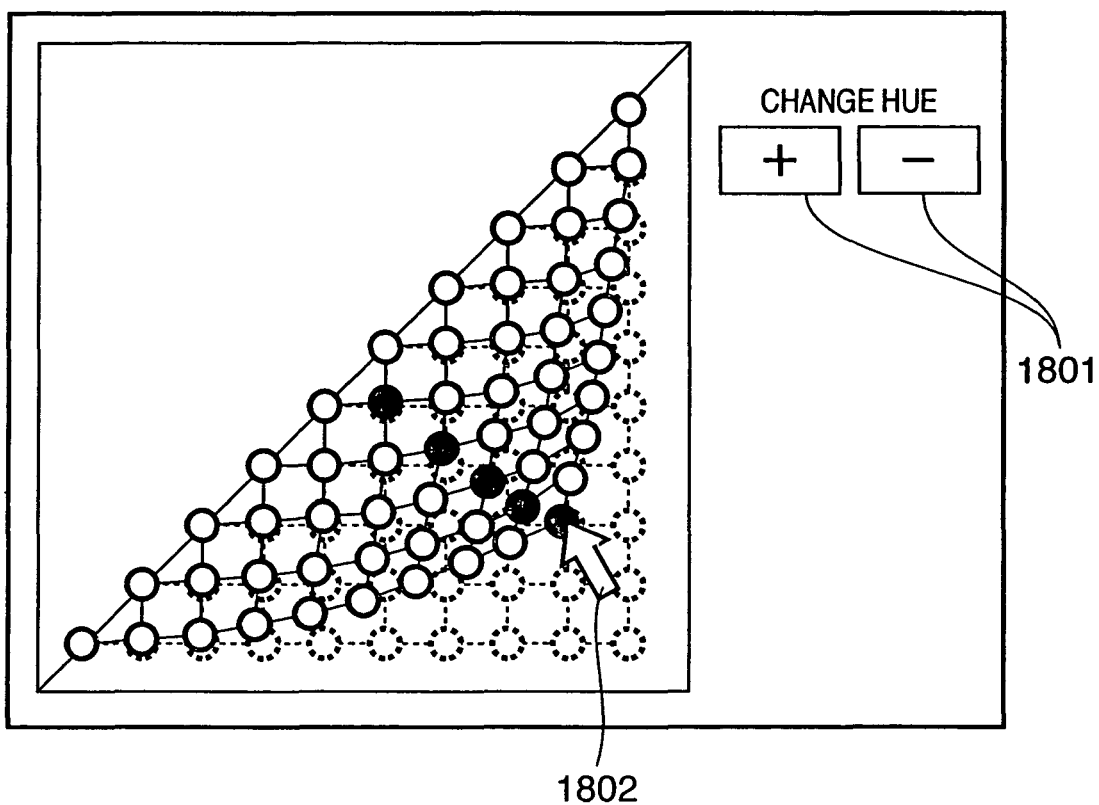

IMAGE PROCESSING METHOD AND APPARATUS

FIELD OF THE INVENTION

The present invention relates to image processing which controls color processing parameters for a digital camera or the like.

The present invention also relates to the customization of image processing in an image sensing apparatus and the generation of a multidimensional lookup table for color processing of a photographed image.

BACKGROUND OF THE INVENTION

Various means for realizing color reproduction desired by users have been devised for digital cameras. For example, Japanese Patent Laid-Open No. 2001-238222 discloses a digital camera which internally holds in advance a plurality of color processing parameters corresponding to a plurality of operation modes, makes a user select one of the operation modes, and performs color processing of photographed image data by using color processing parameters corresponding to the selected operation mode.

In the above digital camera, however, the user can select only color processing parameters corresponding to a given operation mode which are prepared in advance, and hence cannot realize color reproduction by freely setting color processing parameters.

The digital camera internally holds a plurality of image processing parameters in advance, and performs image processing such as color processing of a photographed image by using image processing parameters corresponding to the mode selected by the user. In other words, the user can only set image processing for the digital camera in accordance with a prepared mode, and cannot realize desired color reproduction. In addition, a method of obtaining image processing conditions for a digital camera from a patch photography result (Japanese Patent Laid-Open No. 11-355586 (US AA2003112334)).

SUMMARY OF THE INVENTION

According to the first aspect of the present invention, there is disclosed a technique of receiving the sensed data of an object and the sensed data of the object from an image sensing device which outputs the image data obtained by performing image processing of the sensed data in accordance with color processing parameters, providing a user interface which presents, on a color plane, the position of the color data obtained by performing color processing corresponding to the color processing parameters with respect to the sensed data of an image portion corresponding to an adjustment target color included in the object and the position of the target color data for color reproduction of the adjustment target color in the image sensing device, and accepts a change in the target color data, editing the color processing parameters so as to reduce the color difference between the target color data changed by the user interface and the color data, and transmitting the edited color processing parameters to the image sensing device.

According to this arrangement, the user can arbitrarily set color processing parameters which determine the color reproduction characteristics of a digital camera according to user's preference.

According to the second aspect of the present invention, there is disclosed a technique of inputting the color data of an image sensed by an image sensing device and target data representing the target color of the image, generating a color processing condition which converts the color data into target data, generating a multidimensional lookup table for color processing of the image sensed by the image sensing device, determining whether or not outermost lattice points corresponding to the primary and secondary colors, which are located at outermost positions of the space represented by the multidimensional lookup table, are located inside a predetermined color range, moving an outermost lattice point located outside the predetermined color range into the predetermined color range, and relocating a lattice point near the outermost lattice point in accordance with the movement amount of the outermost lattice point.

According to this arrangement, a multidimensional lookup table for reproducing target data can be generated so as not to cause any color omission error.

According to the third aspect of the present invention, there is disclosed a technique of inputting the color data of an image sensed by an image sensing device and target data representing the target color of the image, providing a user interface which edits a color processing condition for the conversion of the color data into the target data, generating color processing parameters for the image sensed by the image sensing device, and optimizing the color processing parameters on the basis of the difference between the target data and the result obtained by performing color processing of the color data by using the generated color processing parameters.

According to this arrangement, the contents of a complicated matrix computation and image processing can be edited, and optimal image processing parameters can be generated on the basis of the edition result.

According to the fourth aspect of the present invention, there is disclosed a technique of acquiring the color data of an image sensed by an image sensing device and target data representing the target color of the image, generating a color processing condition from the color data and target data, and when generating a multidimensional lookup table for color processing of the image sensed by the image sensing device by using the color processing condition, mapping data located outside a predetermined color range as the result of processing under the color processing condition into the predetermined color range, thereby generating the multidimensional lookup table.

According to this arrangement, the color reproduction of the image sensing device can be set within the color reproduction range of the image output apparatus. In addition, this setting makes it possible to prevent a color omission error.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a view showing a display example of a table of edited input data, target data, and their color differences;

FIGS. 20A and 20B are views showing an example of how two-dimensionally arranged lattice points are mapped;

FIGS. 23 to 25 are views showing an example of the user interface displayed by the relocation unit;

DETAILED DESCRIPTION OF THE PREFERRED EMBODIMENTS

Image processing in the embodiments of the present invention will be described in detail below with reference to the accompanying drawings.

First Embodiment

Arrangement

The arrangement of an image processing system according to the first embodiment will be described first. Note that the image processing system according to the first embodiment includes an image generating apparatus such as a digital camera and an image processing apparatus which processes the image data generated by the digital camera.

Figure 1:
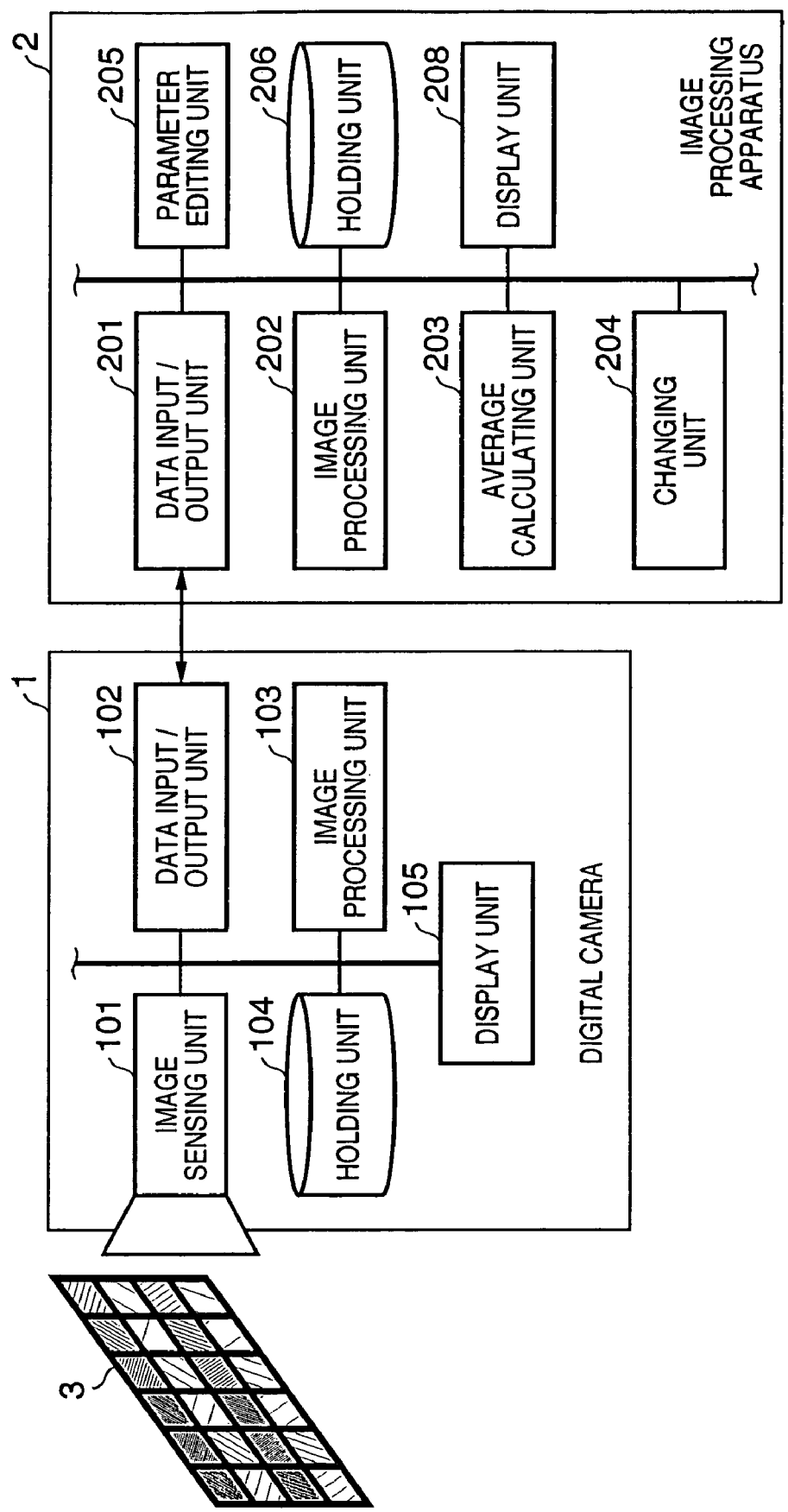
FIG. 1 is a block diagram showing the arrangement of an image processing system according to the first embodiment.
Figure 2:
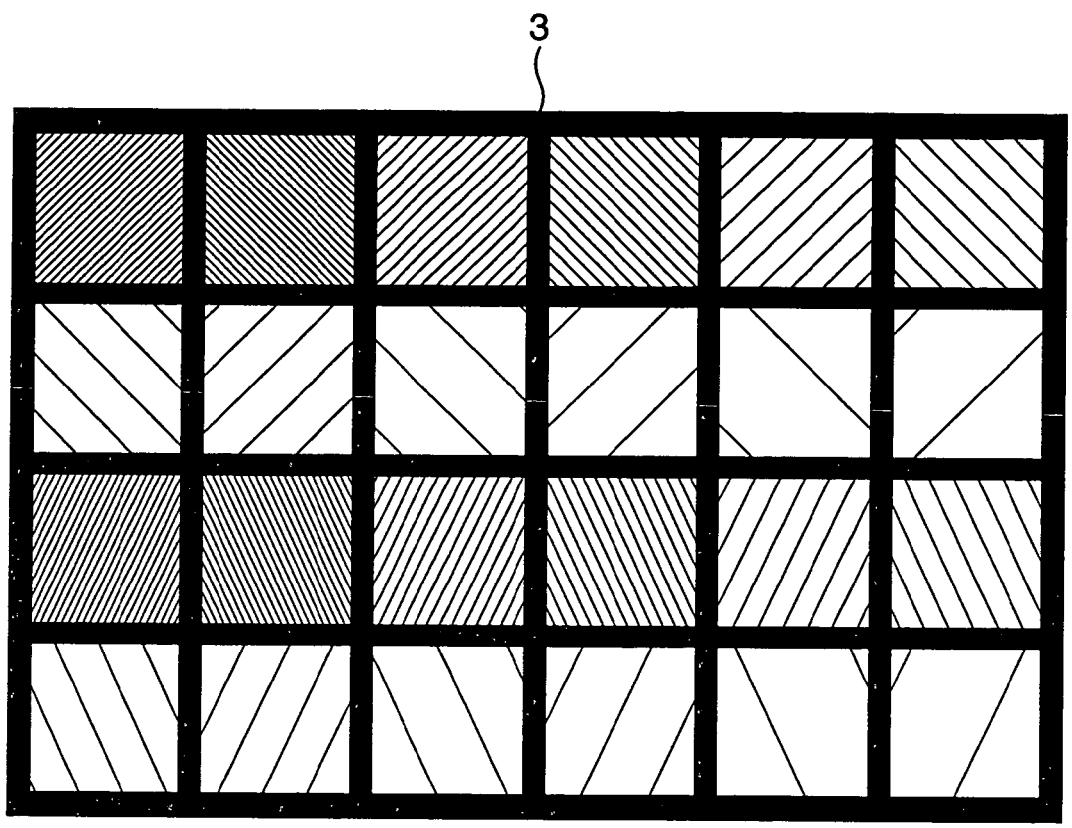
FIG. 2 is a view showing the arrangement of a color chart.

FIG. 1 is a block diagram showing the arrangement of the image processing system according to the first embodiment. The image processing system shown in FIG. 1 includes a digital camera 1 and an image processing apparatus 2 which edits color processing parameters. As shown in FIG. 2, a color chart 3 has 24 color patches arranged for the purpose of color reproducibility determination and analysis. The details of the color chart 3 will be described later.

Digital Camera

The arrangement of the digital camera 1 will be described next.

An image sensing unit 101 is comprised of an optical system including a photographing lens, a stop, and the like and an image sensor such as a CCD (Charge Coupled Device), and outputs sensed data (raw image data) corresponding to the luminance of an object whose image is formed on the light-receiving surface of the CCD. In the first embodiment, the image sensing unit 101 outputs the sensed data obtained by sensing the color chart 3 in which 24 color patches are arranged.

A data input/output unit 102 transmits/receives, to/from an external apparatus, the sensed data output from the image sensing unit 101, the image data output from an image processing unit 103 (to be described later), color processing parameters which are referred to by the image processing unit 103 when it performs processing associated with colors, and the like. The image processing unit 103 performs image processing in accordance with color processing parameters stored in a holding unit 104 (to be described later) on the basis of the sensed data output from the image sensing unit 101, thereby forming image data.

The holding unit 104 holds externally acquired color processing parameters through the data input/output unit 102. A display unit 105 is, for example, a liquid crystal display which displays an image during photography.

With the above arrangement, the digital camera 1 generates image data by using the image processing unit 103 on the basis of the sensed data of an object sensed by the image sensing unit 101, and outputs the generated image data to the outside through the data input/output unit 102.

Image Processing Apparatus

The arrangement of the image processing apparatus 2 will be described next.

A data input/output unit 201 transmits/receives sensed data (raw image data), image data, color processing parameters, target data, and the like by communicating with the digital camera 1. More specifically, the data input/output unit 201 communicates with the data input/output unit 102 of the digital camera 1. In this case, the target data indicates a color target value to be set to realize the color reproducibility desired by the user. Setting of target data will be described later. The data input/output unit 201 also functions as an input device which accepts input from the user. The input device includes, for example, a keyboard and mouse. Note that the data input/output unit 201 communicates with the data input/output unit 102 through, for example, a serial bus such as a universal serial bus (USB) or IEEE1394, infrared communication such as IrDA, a wireless LAN such as IEEE802.1, or a wired LAN such as Ethernet.

An image processing unit 202 refers to the color processing parameters for the digital camera 1 currently connected to the image processing apparatus 2, of the color processing parameters stored in a holding unit 206 (to be described later), to perform image processing equivalent to the internal processing of the connected digital camera 1 with respect to the RGB average value (to be referred to as RGB average data hereinafter) of the sensed data output from an average calculating unit 203 (to be described later), thereby forming image data. That is, the image processing unit 202 reproduces, in the image processing apparatus 2, image processing of sensed data by the image processing unit 103 of the digital camera 1.

Figure 6:
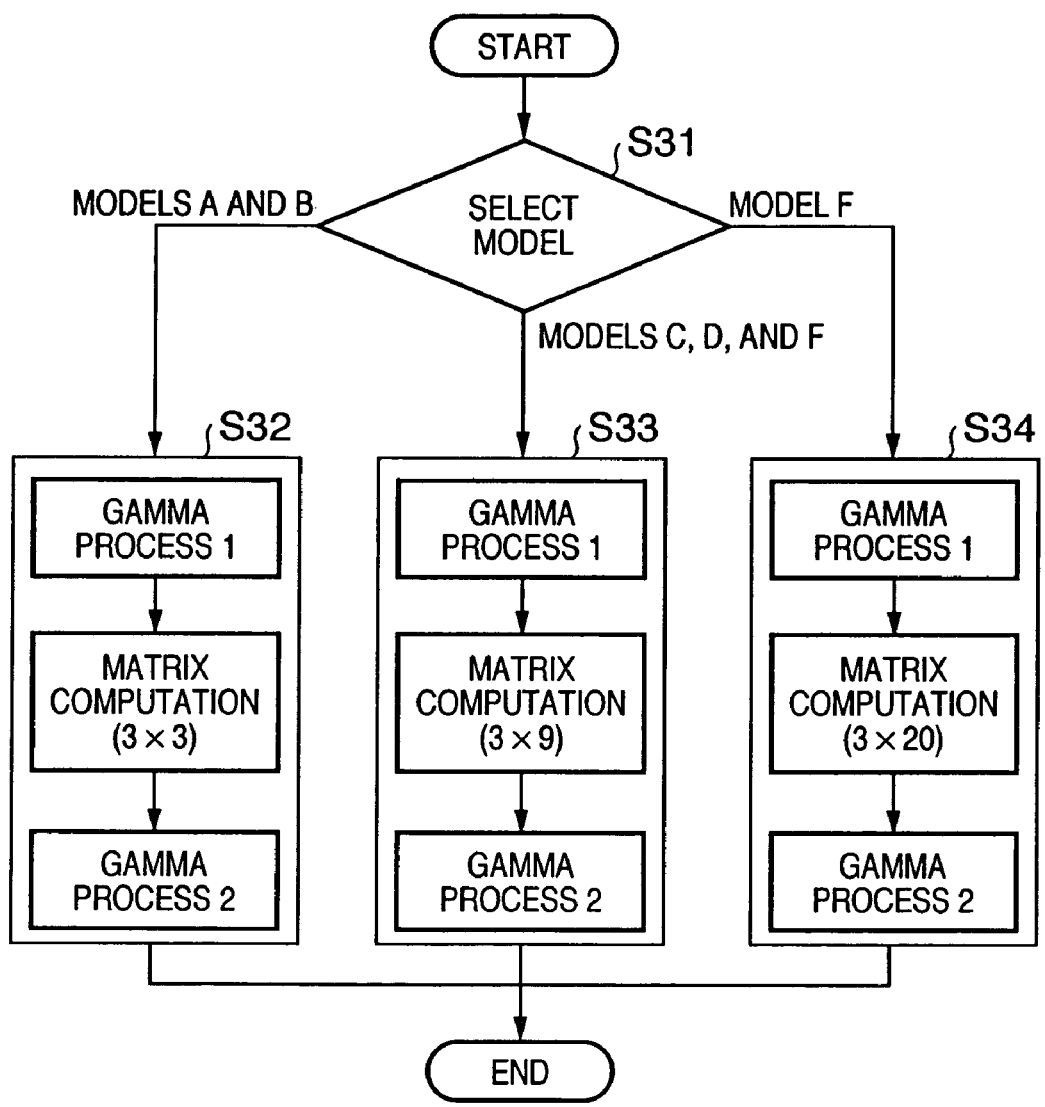
FIG. 6 is a flowchart showing image processing in an image processing unit.

The processing performed by the image processing unit 202 will be described in detail below. FIG. 6 is a flowchart showing the image processing in the image processing unit 202. Assume that in the first embodiment, there are six models of digital cameras, namely models A to F, which can be handled by the image processing apparatus 2. Assume also that these models are classified into three categories, namely a category including the models A and B, a category including the models C, D, and E, and a category including the model F according to the types of internal processes (image processes) of these digital cameras.

As shown in FIG. 6, the image processing unit 202 specifies the model of the digital camera 1 by communicating with the connected digital camera 1 to obtain an ID code for designating a model of the digital camera 1 (S31). If the model of the digital camera 1 is the model A or B, the flow advances to step S32. If the mode of the digital camera 1 is the model C, D, or E, the flow advances to step S33. If the model of the digital camera 1 is the model F, the flow advances to step S34.

In step S32, the image processing unit 202 performs three processes, namely gamma conversion 1, 3×3 matrix computation, and gamma conversion 2, with respect to the RGB average data. In step S33, the image processing unit 202 performs three processes, namely gamma conversion 1, 3×9 matrix computation, and gamma conversion 2. In step S34, the image processing unit 202 performs three processes, namely gamma conversion 1, 3×20 matrix computation, and gamma conversion 2. Note that gamma conversion 1 is, for example, a linear gamma conversion process, Y×Y matrix computation is a filter process using an X (row)×Y (column) matrix, and gamma conversion 2 is a gamma conversion process corresponding to a gamma curve.

The first embodiment will exemplify a case wherein the image processing unit 202 performs image processing of the RGB average data output from the average calculating unit 203. However, the present invention is not limited to this, and sensed data may be directly processed.

In addition, the image processing unit 202 has a function of converting RGB average data after color processing into color data defined in the international commission on illumination (CIE) LAB color space and outputting it as input data (data to be input to a changing unit 204 (to be described later)).

According to the above description, the image processing apparatus 2 specifies the model of the digital camera 1. However, the present invention is not limited to this, and the user may be allowed to selectively specify the model of the digital camera 1 currently connected to the image processing apparatus 2 by using a graphical user interface (GUI) or the like. The average calculating unit 203 calculates the RGB average value of each patch in the sensed data of the color chart 3 input from the data input/output unit 201 and sets it as RGB average data. In the first embodiment, the image processing unit 202 performs the above image processing of the RGB average data of each patch output from the average calculating unit 203 to further convert the data into input data in the CIE LAB color space.

The changing unit 204 displays, on a display unit 208 (to be described later), the target data changing window shown in FIG. 4 obtained by plotting the input data input from the image processing unit 202 and target data on the a*b* plane in the CIE LAB color space. This target data changing window is a GUI. The user can adjust the value of target data to set a preferred color by operating the target data changing window according to user's need. In addition, when the user changes the target data in the target data changing window, the changing unit 204 reflects this in the target data.

Figure 4:
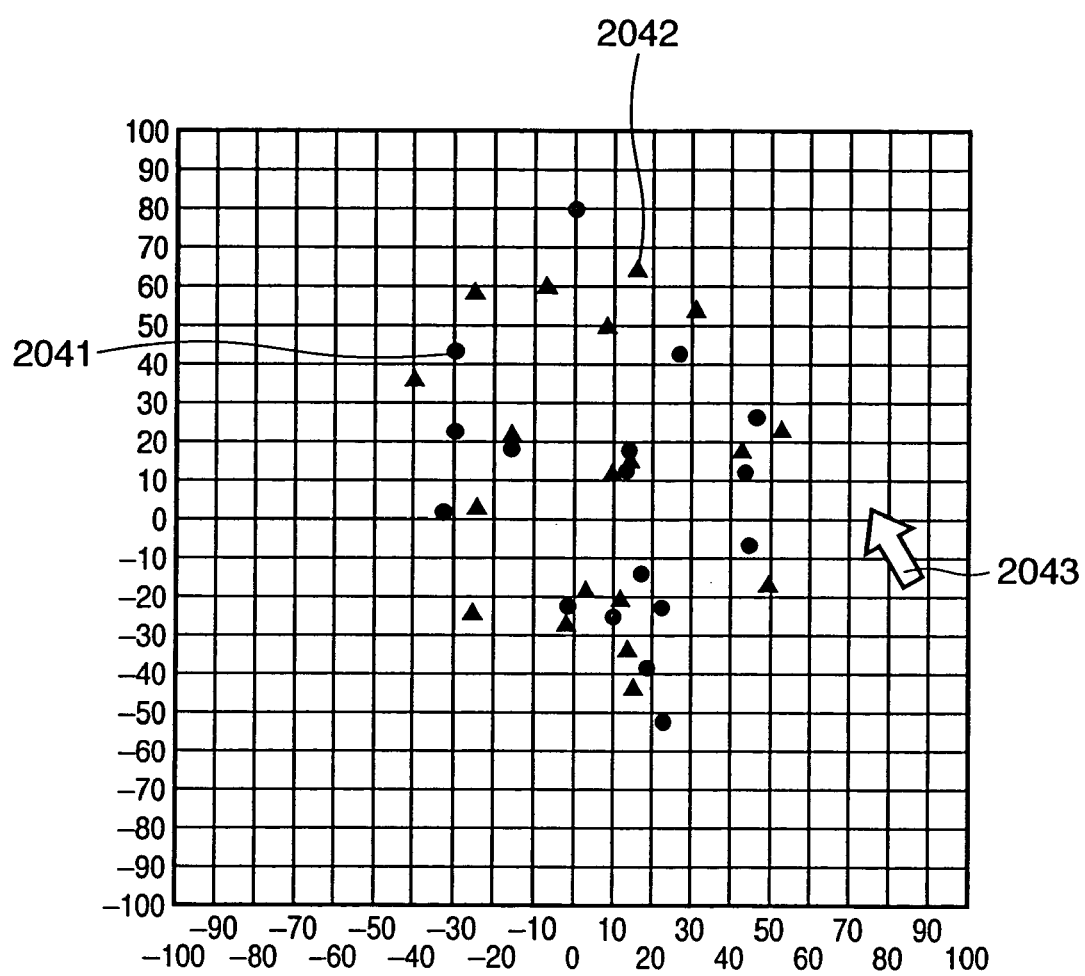
FIG. 4 is a view showing an example of a target data changing window.

FIG. 4 is a view showing an example of the target data changing window displayed on the display unit 208 by the changing unit 204.

As shown in FIG. 4, each circular mark (●) on the a*b* plane represents the input data of each color patch, and each triangular mark (▲) indicates target data. This makes it possible to recognize the difference between the input data of a given color patch and corresponding target data. Assume that target data 2042 corresponding to input data 2041 of a given color patch is displayed at a different position, as shown in FIG. 4. In this case, the user can move the position of the triangular mark, i.e., the position of the target data 2042, with a pointer 2043 of the GUI. Since the changing unit 204 provides the GUI which can move the position of target data, the user can visually change the L*a*b* value of the target data on the target data changing window. Note that the pointer 2043 is a mouse cursor which moves in accordance with the movement of the mouse of the data input/output unit 201.

According to the above description, input data and target data are mapped on the a*b* plane in the CIE LAB color space. However, the present invention is not limited to this, and the data mapped on either the L*a* plane or L*b* plane in the CIE LAB color space may be displayed or data may be mapped in a color space of a different type.

A parameter editing unit 205 edits the color processing parameters stored in the holding unit 206 (to be described later) by using, for example, the dumped least square (DLS) method, so as to minimize the color difference between the input data of each color patch and the target data changed by the user. The DLS method is a method of obtaining processing parameters such that the difference between the data string obtained by processing a given input data string with given processing parameters and a corresponding target data string is brought close to a target sequence. For example, this method is described in detail in Yutou Takahashi, "Lens Design", Tokai University Press, p. 194.

The holding unit 206 holds color processing parameters on a model basis for all kinds of digital cameras whose models can be specified. The holding unit 206 also holds input data, default target data, and the target data changed by the user in correspondence with the respective color patches for each model of digital camera. The display unit 208 displays the image data obtained after the image processing unit 202 performs color processing of the sensed data loaded by the data input/output unit 201, the image data loaded by the data input/output unit 201, or the like. Note that the display unit 208 is a display apparatus such as a CRT or liquid crystal display, and preferably a display apparatus which, for example, complies with the color management system to properly reproduce colors.

In addition, the data input/output unit 102 of the digital camera 1 may further include a nonvolatile memory which records image data and a reader/writer which writes/reads/erases sensed data, image data, color processing parameters, and the like with respect to the nonvolatile memory. In this case, the nonvolatile memory may be designed to be detachable with respect to the digital camera 1. In addition, if the data input/output unit 201 of the image processing apparatus 2 includes a reader/writer which reads/writes sensed data and image data with respect to the nonvolatile memory, sensed data, image data, and color processing parameters may be exchanged between the digital camera 1 and the image processing apparatus 2 through the nonvolatile memory.

[Operation of Digital Camera]

The operation of the digital camera 1 will be described next.

First of all, when performing photography by using the digital camera 1, the user turns on the power switch (not shown) of the digital camera 1. The image sensing unit 101 of the digital camera 1 which is activated by this operation outputs sensed data. The image processing unit 103 generates display image by performing image processing of the sensed data by using color processing parameters stored in the holding unit 104, and displays it on the display unit 105. The processing of generating display images from this sensed data is performed at a rate of 1/30 sec.

The user then determines the composition of the object to be photographed by seeing the image displayed on the display unit 105, and presses the shutter button (not shown), thereby performing photography. When the shutter button is pressed, the image processing unit 103 outputs image data upon performing adjustment processing associated with image color and brightness and the like with respect to the sensed data by using color processing parameters stored in the holding unit 104. The data input/output unit 102 outputs, to an external apparatus, the sensed data or image data output at the timing when the shutter button is pressed.

If a parameter which causes the sensed data output from the image sensing unit 101 to be output to the data input/output unit 102 without any change is set in the holding unit 104, the data input/output unit 102 can acquire the sensed data (raw image data) output from the image sensing unit 101. In addition, as described above, the respective models of the digital cameras 1 differ in internal image processing. For example, different digital models perform digital filter computations by using a 3×3 matrix, 3×9 matrix, and 3×20 matrix, respectively. That is, different color processing parameters are used in accordance with the models of the digital cameras 1.

[Color Chart]

FIG. 2 is a view showing the arrangement of the color chart 3.

As shown in FIG. 2, the color chart 3 is comprised of color patches including grayscale and covering all hues, like ColorChecker DC available from GretagMacbeth or the like. As shown in FIG. 2, the color chart 3 in the first embodiment is comprised of 24 color patches. However, the present invention is not limited to this, and the color chart may be comprised of color patches of a number corresponding to a combination of various hues and gray levels.

[Operation of Image Processing Apparatus]

Figure 3:
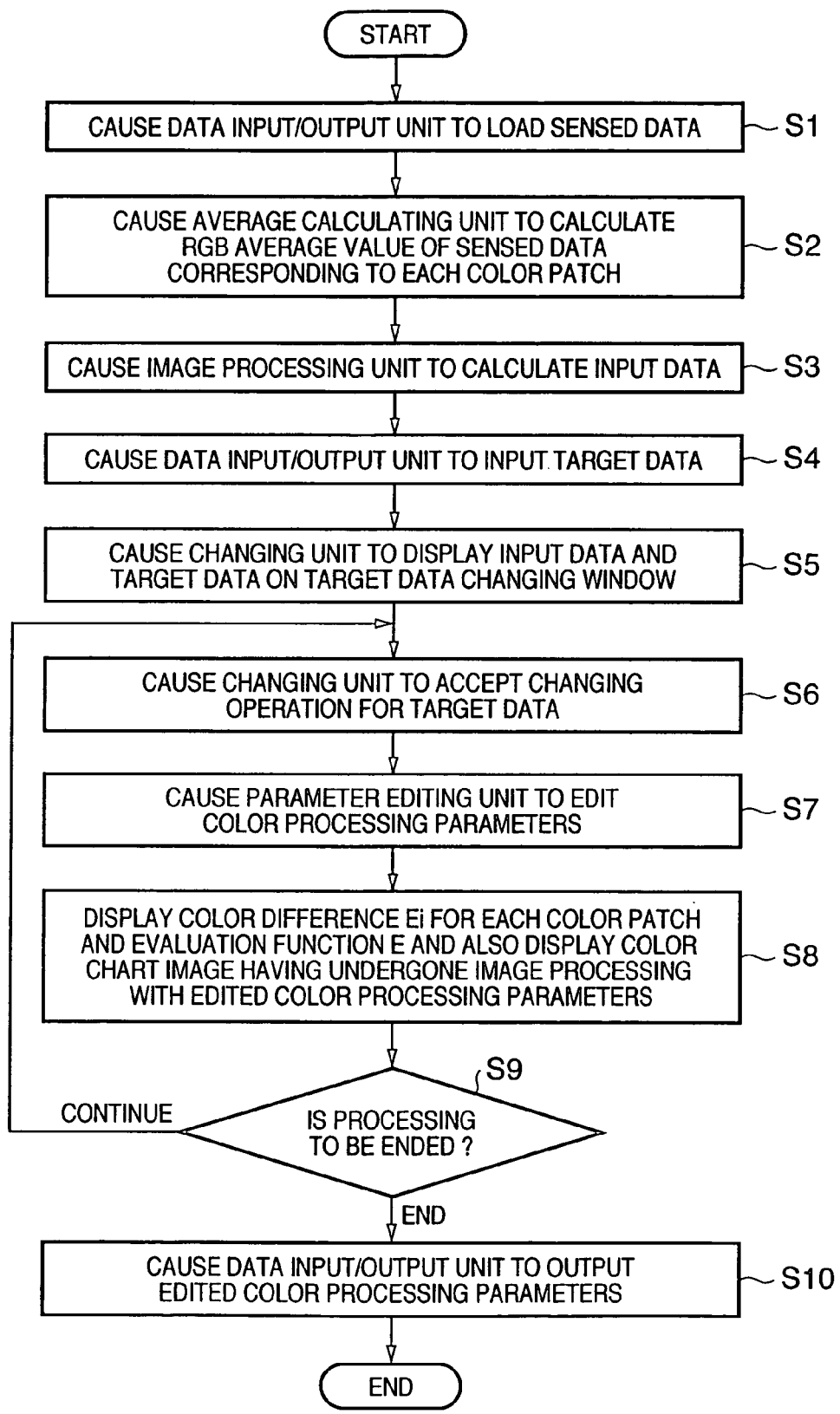
FIG. 3 is a flowchart showing the operation of an image processing apparatus.

The operation of the image processing apparatus 2 will be described next. FIG. 3 is a flowchart showing the operation of the image processing apparatus 2.

As shown in FIG. 3, first of all, the data input/output unit 201 loads sensed data through the data input/output unit 102 of the digital camera 1 (S1). In the first embodiment, the sensed data of the color chart 3 is loaded. The average calculating unit 203 then obtains the RGB average value (RGB average data) of the sensed data of each color patch loaded by the data input/output unit 201 (S2).

The image processing unit 202 performs color processing of the RGB average data calculated by the average calculating unit 203 by using color processing parameters stored in advance in the holding unit 206 which correspond to the currently connected digital camera 1. The image processing unit 202 then calculates input data in the CIE LAB format which is to be input to the changing unit 204 by assuming the RGB data after the color processing (to be referred to as color-processed data hereinafter) to be sRGB defined by IEC (International Electrotechnical Commission) 61966-2-1 and the white point to be D65 (S3). Note that the color processing in the image processing unit 202 will be described in detail later with reference to FIG. 6.

Target data is input from the holding unit 206 or data input/output unit 201 (S4). In this case, the target data may be identical to the previously calculated input data or may be the color data in the CIE LAB format which is obtained by, for example, performing colorimetry on each color patch of the color chart 3 using SpectroLino available from GretagMacbeth, which is a compact spectrophotometer. Note that the data format of the target data in the first embodiment is the CIE LAB format of color data like the above input data.

The changing unit 204 displays the input data calculated by the image processing unit 202 and the target data input in step S4 in the target data changing window (S5). The changing unit 204 accepts the operation of moving the position of the target data by the user as needed, and sets the LAB value determined by the position of the target data after the movement as new target data (S6). At this time, the user can enhance the reddishness of target data representing a skin color or the bluishness of target data representing the sky blue according to user's preference.

Figure 7:
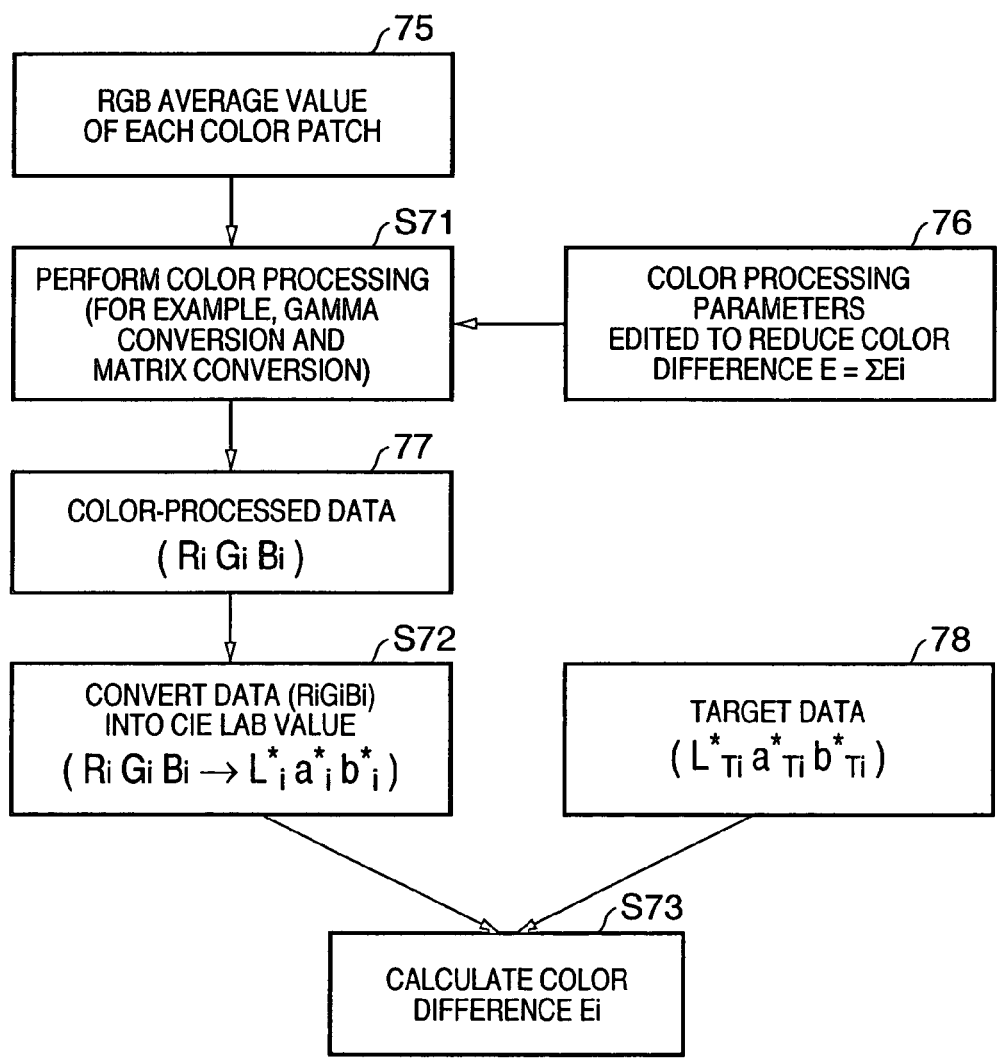
FIG. 7 is a flowchart showing editing processing of color processing parameters.

The parameter editing unit 205 edits color processing parameters in accordance with the color difference between the input data and the changed target data (S7). More specifically, the parameter editing unit 205 performs the processing shown on the left half of FIG. 7. FIG. 7 is a flowchart showing editing processing of color processing parameters in step S7.

As shown in FIG. 7, the parameter editing unit 205 calculates color-processed data (Ri, Gi, Bi) 77 by performing color processing similar to that in the image processing unit 202 with respect to an RGB average value 75 (RGB average data) of each color patch by using color processing parameters 76 after edition (S71). In this case, "i" represents the identification number (ID) of each color patch. Since there are 24 color patches in the first embodiment, i=0 to 23.

The parameter editing unit 205 calculates data ($L*_i$, $a*_i$, $b*_i$) obtained by converting the color-processed data (Ri, Gi, Bi) 77 into data in the CIE LAB format (S72), and calculates a color difference Ei between the color-processed data ($L*_i$, $a*_i$, $b*_i$) of each color patch and corresponding target data ($L*_{Ti}$, $a*_{Ti}$, $b*_{Ti}$). The parameter editing unit 205 then adds the color differences Ei of all the color patches to calculate an evaluation function E as a color processing parameter by $$E = S_i Ei \quad (1)$$
$$= S_i \sqrt{\{(L*_{Ti} - L*_i)^2 + (a*_{Ti} - a*_i)^2 + (b*_{Ti} b*_i)^2\}}$$

Subsequently, the parameter editing unit 205 calculates a color processing parameter which minimizes the color difference Ei between the color-processed data ($L*_i$, $a*_i$, $b*_i$) of each color patch and the corresponding target data ($L*_{Ti}$, $a*_{Ti}$, $b*_{Ti}$) as a whole by using the DLS method or the like. By obtaining a color processing parameter which minimizes the evaluation function E, the color processing parameter can be edited to bring the color-processed data as close to the target data as possible.

In addition, the calculation of the evaluation function E is not limited to that using equation (1), and the evaluation function E may be calculated by individually setting a weight for each color patch. In this case, letting $w_i$ be a weight value, the evaluation function E is calculated by $$E = S_i w_i E_i \quad (2)$$

$$= S_i w_i v\{(L*_{Ti} - L*_i)^2 + (a*_{Ti} - a*_i)^2 + (b*_{Ti} - b*_i)^2\}$$

Equation (2) is the same as equation (1) except that each value $E_i$ is multiplied by the weight value $w_i$.

The parameter editing unit 205 displays the color difference Ei corresponding to ID=i of each color patch and the evaluation function E on the display unit 208 in the form of a table 50 shown in FIG. 5 (S8). The details of the table 50 in FIG. 5 will be described in detail later. The image processing unit 202 further performs image processing of the sensed data by using the color processing parameters edited by the parameter editing unit 205, and displays an image (an image of the color chart 3) after the image processing on the display unit 208 (S8).

With the above operation, the user can check, on the table 50 shown in FIG. 5, the color difference Ei between target data and the input data (to be referred to as edited input data hereinafter) obtained by performing color processing of the RGB average value of each color patch using the color processing parameters after the edition, and can also check from the image display of the color chart 3 whether each color patch is reproduced in a desired color.

FIG. 5 is a view showing an example of a table of the edited input data of the respective color patches, target data, and their color differences. As shown in FIG. 5, the table 50 displays the target data of the respective color patches, edited input data, weight values wi, color differences Ei, and hue angles in ID order, and the evaluation function E is displayed at the end of the table. Displaying the table 50 on the display unit 208 makes it easy for the user to determine whether or not color processing parameters are edited in accordance with target data.

By checking the table 50 and the image display of the color chart 3, the user determines whether or not to finish changing the target data and editing the color processing parameters, and gives the image processing apparatus 2 an instruction to continue or finish the processing, thereby letting the image processing apparatus 2 determine whether to continue or finish the processing (S9). If the instruction given by the user represents continuation of the processing, the flow returns to step S6 to shift to the target data changing window again. If the instruction given by the user represents finish of the processing, the flow advances to step S10. Note that the instruction given by the user is input through, for example, the data input/output unit 201.

The data input/output unit 201 transmits the edited color processing parameters to the data input/output unit 201 of the digital camera 1 (S10). With this operation, the color processing parameters are uploaded into the digital camera 1.

In this manner, the image processing apparatus 2 can edit color processing parameters in accordance with the movement of the position of target data by the user, and reflect the edition result in color processing performed by the digital camera 1. That is, color processing parameters which determine the color reproduction characteristics of the digital camera 1 can be arbitrarily set according to user's preference.

In the above processing, target data is input to the image processing apparatus 2 in step S4. However, the present invention is not limited to this. Target data may be input to the image processing apparatus 2 at an arbitrary timing as long as it is before step S5.

Second Embodiment

An image processing system according to the second embodiment will be described next, in which the changing unit 204 described above further has a function of providing a user with an environment which allows the user to uniformly change the saturation of target data on the target data changing window. Note that the arrangement of the image processing system according to the second embodiment is the same as that of the first embodiment shown in FIG. 1, and is comprised of a digital camera 1 and image processing apparatus 2. The internal arrangements of the digital camera 1 and image processing apparatus 2 are the same as those in the first embodiment except for the above function of a changing unit 204. This embodiment also differs from the first embodiment in that the user can change the saturation of target data in step S6 in FIG. 3. Processing associated with the saturation of target data, which is different from that in the first embodiment, will be described below.

Figure 9:
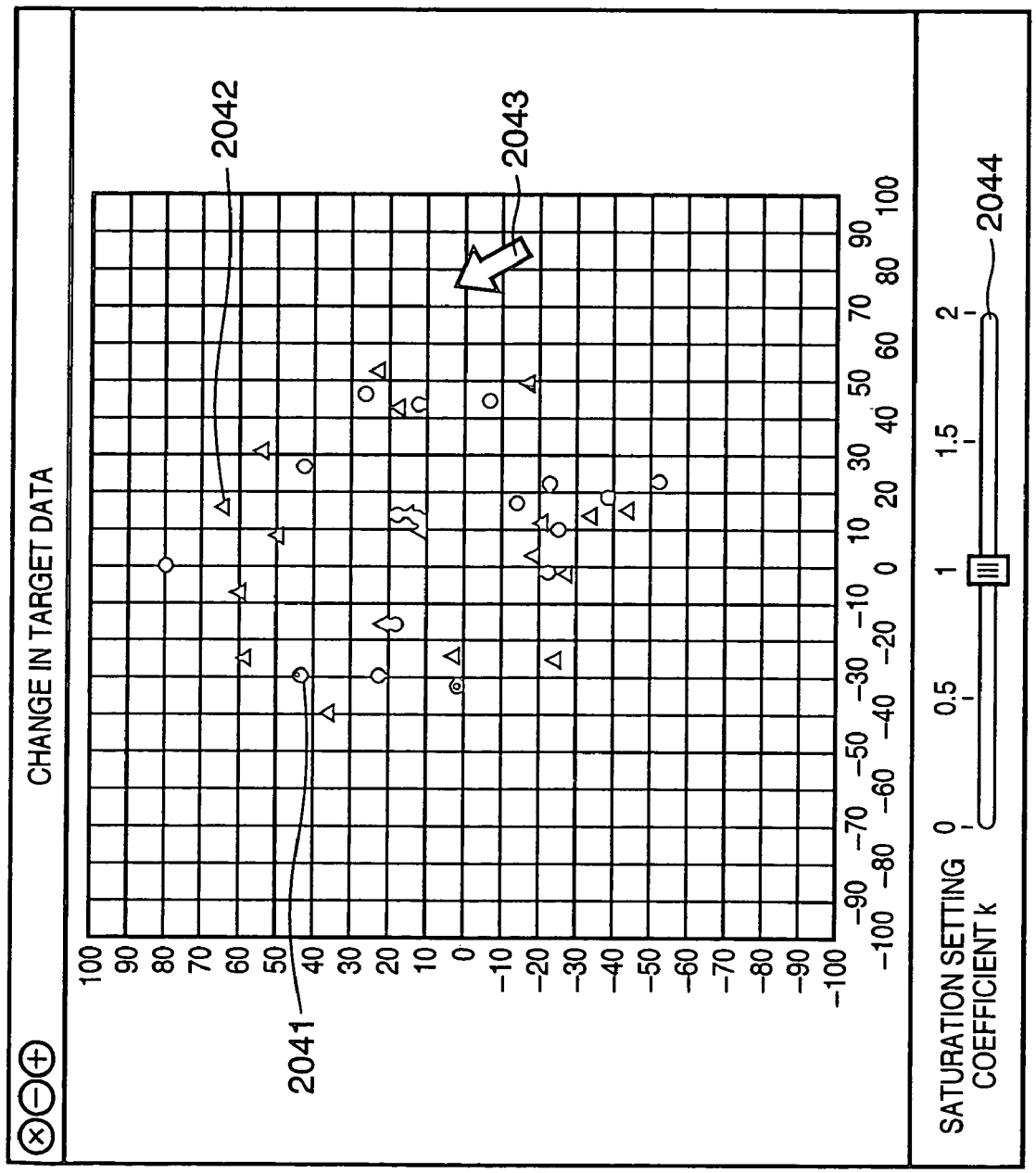
FIG. 9 is a view showing an example of a target data changing window in the second embodiment.

For example, as shown in FIG. 9, the changing unit 204 displays a slider bar 2044, which is used to change the value of a constant k, and the like in the target data changing window. The user can uniformly change the saturation of target data by changing the value of the constant k.

The relationship between the constant k and saturation Si will be described below. The saturation Si of given target data $(L*_{Ti}, a*_{Ti}, b*_{Ti})$ is obtained by $$Si = v(a*_{Ti}^2 + b*_{Ti}^2) \quad (3)$$

The changing unit 204 uniformly changes the saturation Si of the target data $(L*_{Ti}, a*_{Ti}, b*_{Ti})$ according to equation (4) by using the constant k.

$$Si + \Delta Si = k$$

$$Si = kv(a*_{Ti}^2 + b*_{Ti}^2) = v\{(k \cdot a*_{Ti})^2 + (k \cdot b*_{Ti})^2\} \quad (4)$$

That is, in the changing unit 204, when the constant k is set, the value of target data is changed to $(L*_{Ti}, ka*_{Ti}, kb*_{Ti})$.

Figure 8:
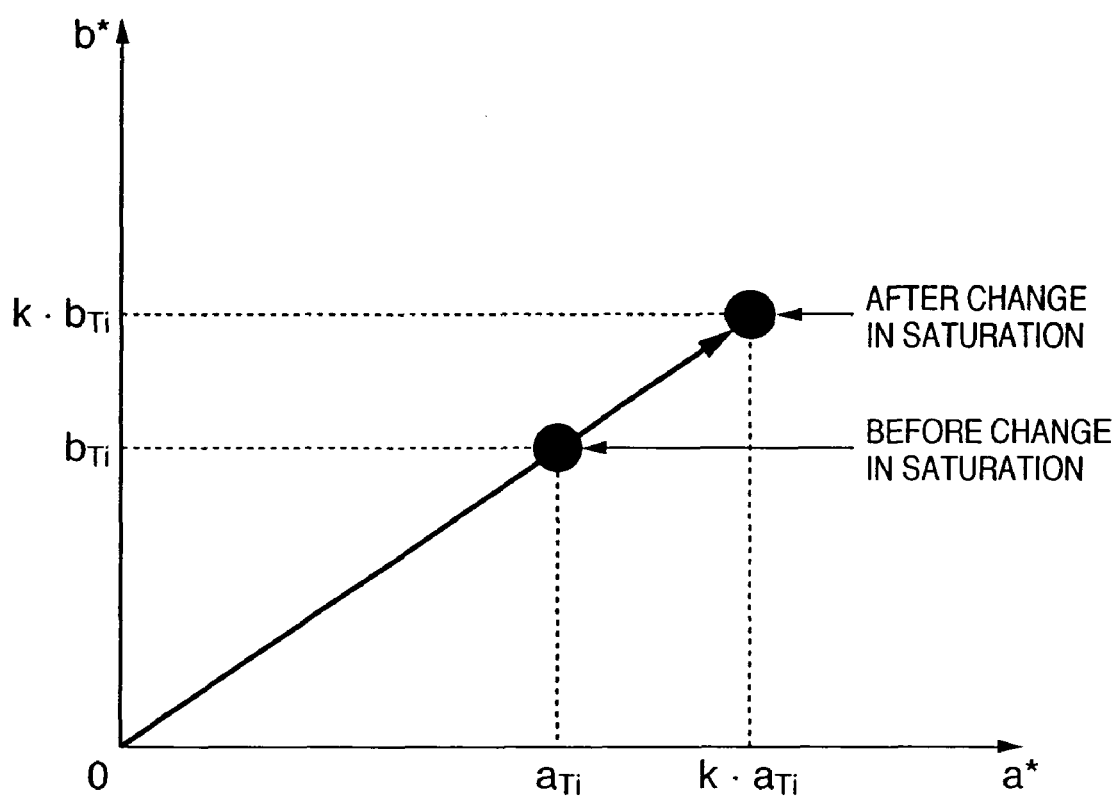
FIG. 8 is a graph showing an example of how target data is moved before and after a change in saturation.

FIG. 8 is a view showing an example of the movement of target data on the a*b* plane before and after the saturation is changed. The example of the movement shown in FIG. 8 indicates the movement of target data on the a*b* plane when the value of the constant k is about 1.4. Note that the value, 1.4, of the constant k described above is an example. An arbitrary constant k can be set according to user' preference.

In this manner, the image processing apparatus 2 in the second embodiment allows the user to uniformly change the saturation of target data to desired saturation, and color processing parameters are edited in accordance with the target data after the change to be reflected in processing in the digital camera 1. That is, color processing parameters which determine the color reproduction characteristics of the digital camera 1 can be set such that the saturation of target data is set to well-balanced saturation according to user's preference. This makes it possible to uniformly change the saturation expression by the digital camera 1.

Modification

In the first and second embodiments described above, the digital camera 1 and image processing apparatus 2 exchange data by using a communication path such as a cable or wireless channel. However, the present invention is not limited to this, and data may be exchanged between the digital camera 1 and the image processing apparatus 2 by using a recording medium which is a nonvolatile memory and is detachable from the digital camera 1 and image processing apparatus 2.

In the above embodiment, as the evaluation function E, equation (1) or (2) is used. However, the present invention is not limited to this. For example, $\Delta E_{94}$ expressed by equation (5) below may be used as an evaluation function Ei.

$$Ei = \Delta E_{94} \quad (5)$$
$$= \sqrt{[\Delta L*^2 + \{\Delta C*/(1+0.045C_1)\}^2 + \{\Delta H*/(1+0.015C_1)\}^2]}$$

for $\Delta L* = L*_{Ti} - L*_i$ $\Delta C* = \sqrt{(a*_{Ti}^2 + b*_{Ti}^2)} - \sqrt{(a*_i^2 + b*_i^2)}$ $\Delta H* = \sqrt{(\Delta E^2 - \Delta L*^2 - \Delta C^2)}$ $C_1 = \sqrt{(a*_{Ti}^2 + b*_{Ti}^2)}$ In the above embodiment, there are six models of digital cameras, namely models A to F, and three types of processing are executed by the image processing unit 202 in accordance with a model. However, the present invention is not limited to this, and the number of camera models may be an arbitrary number. For example, gamma conversion 1, 3×30 matrix computation, and gamma conversion 2, a high-precision color conversion process using a three-dimensional lookup table (3D LUT), and the like may be added to the above processes.

In addition, the present invention incorporates the embodiments described above which are executed by supplying the program codes of software for realizing the respective functions in the above embodiments to a computer (CPU or MPU) in an apparatus or system connected to various devices to operate the devices so as to realize the function of the image processing apparatus 2, and causing the computer in the system or apparatus to operate the respective devices in accordance with programs stored in a memory.

Third Embodiment

Image processing in the third embodiment of the present invention will be described below. The same reference numerals as in the first embodiment denote the same parts in this embodiment, and a detailed description thereof will be omitted.

Figure 10:
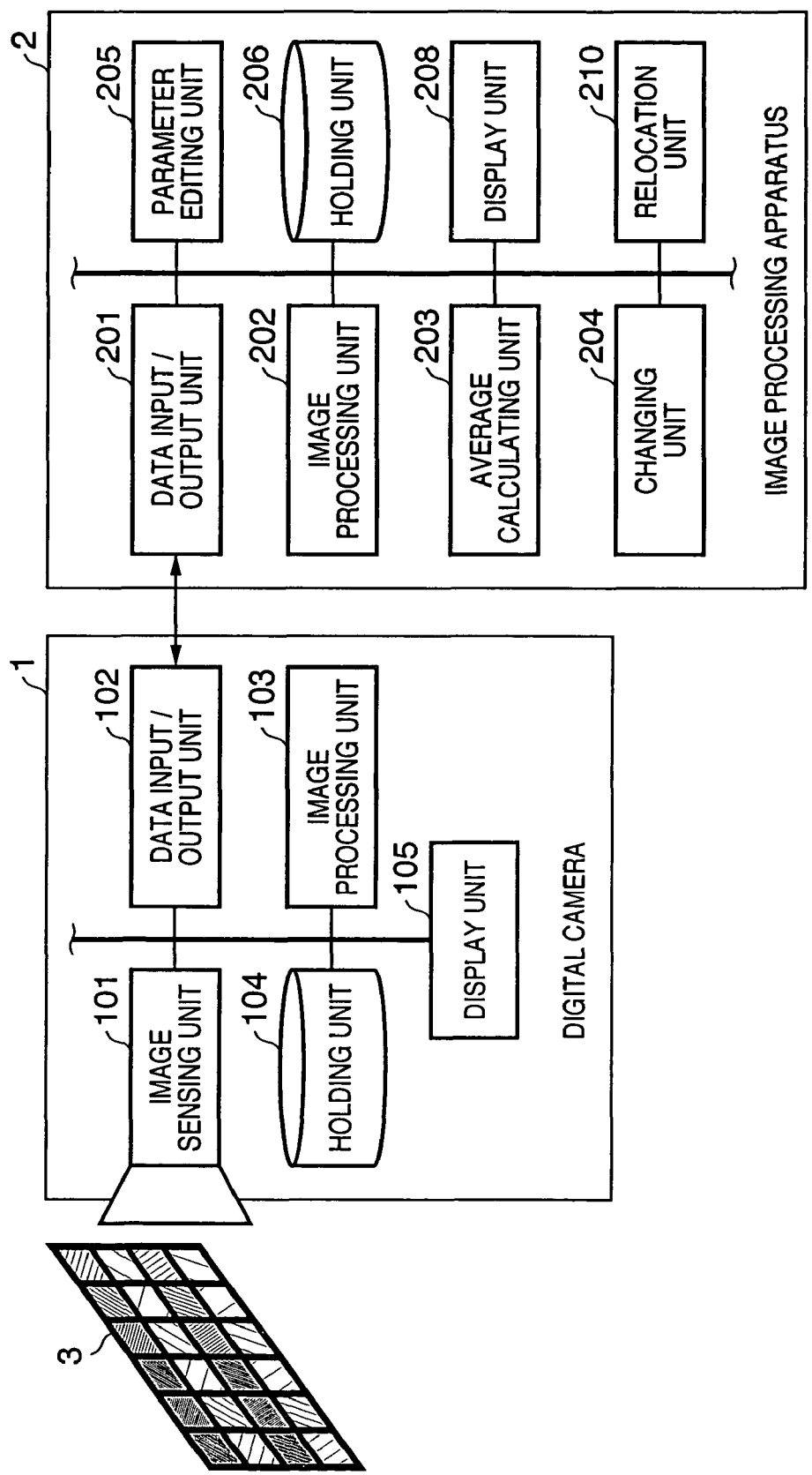
FIG. 10 is a block diagram showing the arrangement of a system according to the third embodiment.

FIG. 10 is a block diagram showing the arrangement of a system according to the third embodiment. This system includes a digital camera 1, an image processing apparatus 2 which customizes color correction parameters, and a color chart 3.

The arrangement of the image processing apparatus 2 differs from that in the first embodiment shown in FIG. 1 in that it includes a relocation unit 210 which determines whether or not target data is included in a predetermined area (sRGB, AdobeRGB, or the like), and relocates target data located outside the area into the area.

[Image Processing Apparatus]

Figure 11:
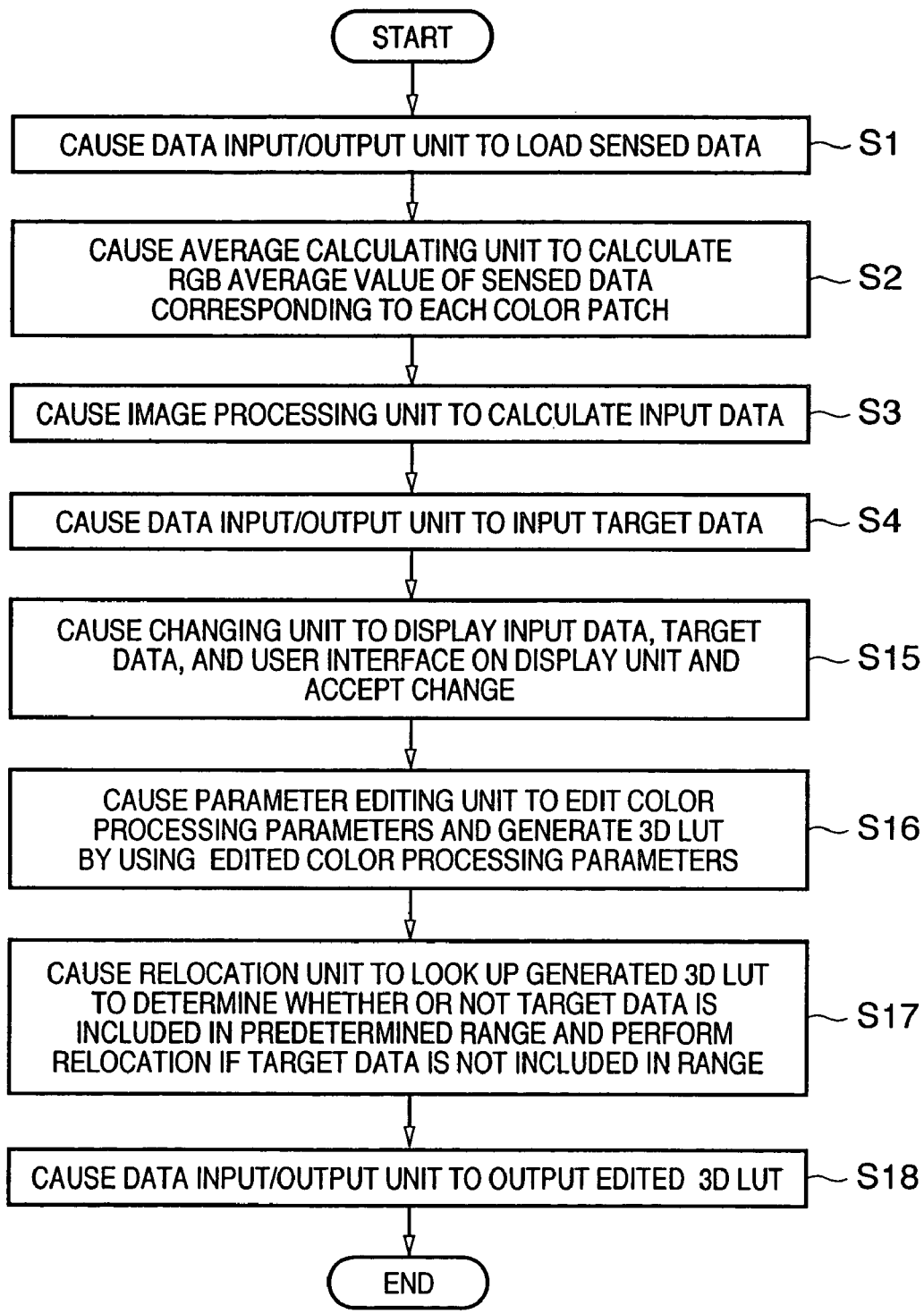
FIG. 11 is a flowchart showing the flow of processing in an image processing apparatus.

FIG. 11 is a flowchart showing the flow of processing in the image processing apparatus 2. The processing from step S1 to step S4 is the same as that in the first embodiment shown in FIG. 3, and hence a detailed description thereof will be omitted.

A changing unit 204 displays input data, target data, and a user interface on a display unit 208 and accepts a change in target data (S15). A parameter editing unit 205 edits color processing parameters and generates a three-dimensional lookup table (3D LUT) by using the color processing parameters after the edition (S16). The relocation unit 210 then refers to the generated 3D LUT to determine whether or not the target data is included in a predetermined area (sRGB, AdobeRGB, or the like). If the target data is not included in the area, the relocation unit 210 performs relocation (S17). The processing from step S15 to step S17 will be described in detail later.

A data input/output unit 201 outputs the optimized 3D LUT (S18). The output 3D LUT is uploaded into the digital camera 1 through a cable or recording medium and is stored in a holding unit 104 to be used for color processing by an image processing unit 103.

[Method of Editing Color Processing Parameters]

Figure 12:
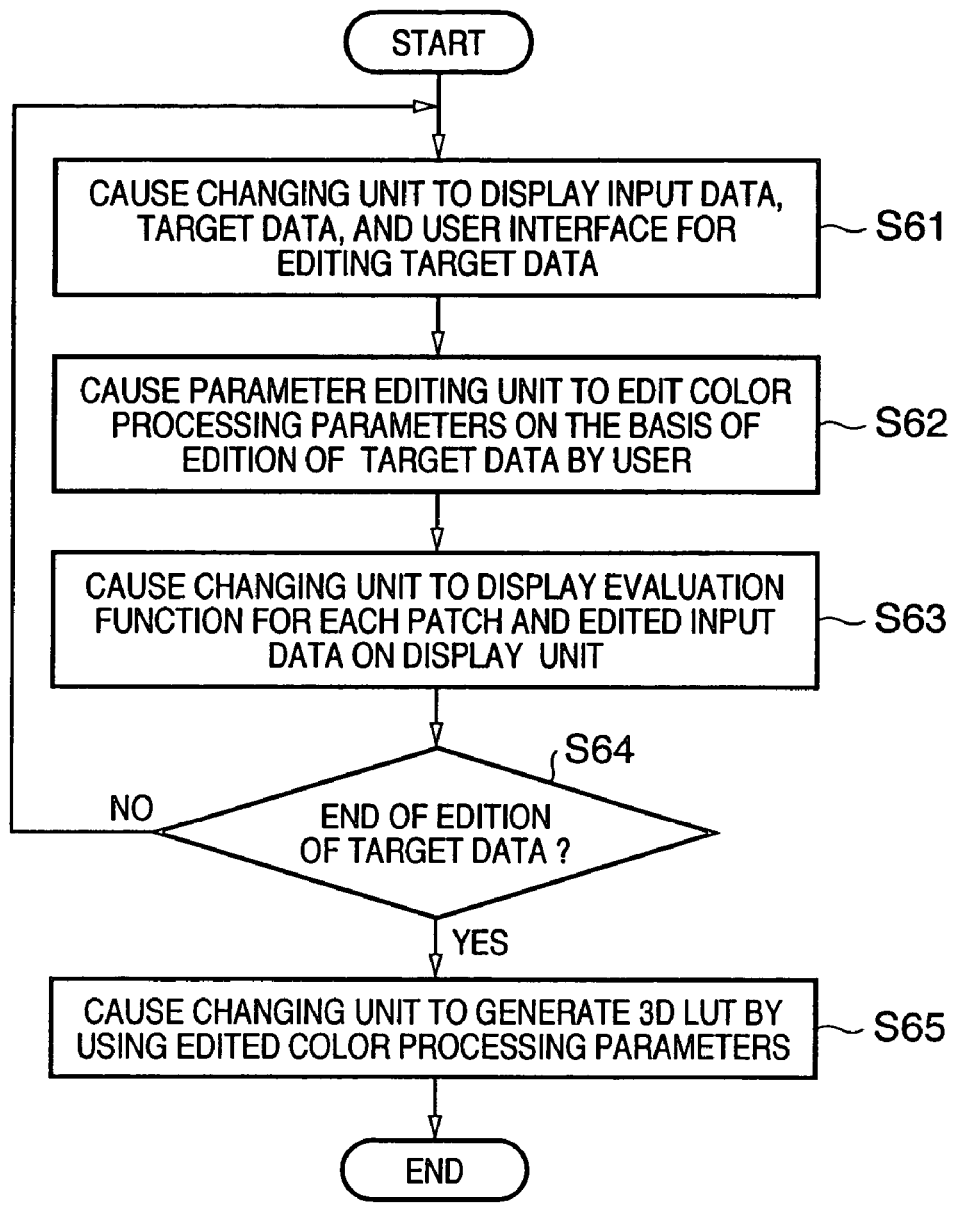
FIG. 12 is a flowchart for explaining editing processing of color processing parameters which is executed by a changing unit and parameter editing unit.

FIG. 12 is a flowchart for explaining the editing processing (S15, S16) performed by the changing unit 204 and parameter editing unit 205.

First of all, the changing unit 204 displays input data, target data, and a user interface for the edition of the target data on the display unit 208. A method of displaying data will be described in detail later. The user refers to the displayed data and edits the target data by operating the user interface as needed (S61). At this time, for example, the user can enhance the reddishness of a skin color or the bluishness of sky blue according to user's preference.

The parameter editing unit 205 then edits (optimizes) color processing parameters by the method described in the first embodiment on the basis of the edition of the target data by the user (S62).

The changing unit 204 displays an evaluation function Ei for each patch and an evaluation function E on the display unit 208, and supplies the edited color processing parameters to an image processing unit 202 to make it perform image processing of the sensed data input in step S1 and stored in a holding unit 206. The changing unit 204 then displays the resultant edited input data on the display unit 208 (S63). In this case, the evaluation function Ei for each patch and evaluation function E are displayed in the manner shown in FIG. 5.

The changing unit 204 prompts the user to determine whether to finish editing the target data, on the basis of the evaluation function Ei for each patch and evaluation function E, calculated in step S63, and the image displayed on the display unit 208 (S64). When the user inputs information indicating the determination through the user interface, the flow returns to step S61 if the determination is to continue editing the target data, or the flow advances to step S65 if the determination is to finish the edition.

When the edition of the target data is to be finished, the changing unit 204 generates a 3D LUT by using the edited color processing parameters (S65). The following is a method of generating a 3D LUT assuming that the RGB data input to the digital camera 1 is 10-bit (0 to 1023) data, and the slice count of the 3D LUT is 17.

(R, G. B)=(0, 0, 0)(0, 0, 64)(0, 0, 128) . . . (0, 0, 1023)(0, 64, 0)(0, 64, 64) . . . (0, 64, 1023)(0, 128, 0)(0, 128, 64) . . . (1023, 1023, 1023)

The above 4,913 data are sequentially input, and L*a*b* values are calculated by the method described in step S3 by using the edited color processing parameters. The calculated 4,913 combinations of RGB–L*a*b* values are stored as a 3D LUT in the holding unit 206.

The following is an example of an sRGB→CIE LAB conversion formula.

sRGB→CIE XYZ Conversion

When $R_{sRGB} \leq 0.04045$, then $R_{liner} = R_{sRGB}/12.92$

When $R_{sRGB} > 0.04045$, then $R_{liner} = \{(R_{sRGB}+0.055)/1.055\}^{2.4}$ (6)

When $G_{sRGB} \leq 0.04045$, then $G_{liner} = G_{sRGB}/12.92$

When $G_{sRGB} > 0.04045$, then $G_{liner} = \{(G_{sRGB}+0.055)/1.055\}^{2.4}$ (7)

When $B_{sRGB} \leq 0.04045$, then $B_{liner} = B_{sRGB}/12.92$

When $B_{sRGB} > 0.04045$, then $B_{liner} = \{(B_{sRGB}+0.055)/1.055\}^{2.4}$ (8)

$$\begin{vmatrix} X \\ Y \\ Z \end{vmatrix} = \begin{vmatrix} 0.4124 & 0.3576 & 0.1805 \\ 0.2126 & 0.7152 & 0.0722 \\ 0.0193 & 0.1192 & 0.9505 \end{vmatrix} \begin{vmatrix} R_{liner} \\ G_{liner} \\ B_{liner} \end{vmatrix} \times 100 \quad (9)$$

CIE XYZ→CIE LAB Conversion $Xn=95.045$ $Yn=100.000$ $Zn=108.892$ (10)

When $X/Xn > 0.00856$, then $X_{Rate} = (X/Xn)^{1/3}$

When $X/Xn \leq 0.00856$, then $X_{Rate} = 7.787 \times (X/Xn) + 16.0/116.0$ (11)

When $Y/Yn > 0.00856$, then $Y_{Rate} = (Y/Yn)^{1/3}$

When $Y/Yn \leq 0.00856$, then $Y_{Rate} = 7.787 \times (Y/Yn) + 16.0/116.0$ (12)

When $Z/Zn > 0.00856$, then $Z_{Rate} = (Z/Zn)^{1/3}$

When $Z/Zn \leq 0.00856$, then $Z_{Rate} = 7.787 \times (Z/Zn) + 16.0/116.0$ (13)

When $Y/Yn > 0.00856$, then $L^* = 116.0 \times (Y/Yn)^{1/3} - 16.0$

When $Y/Yn \leq 0.00856$, then $L^* = 903.29 \times (Y/Yn)$ (14)

$a^* = 500 \times (X_{Rate} - Y_{Rate})$ $b^* = 200 \times (Y_{Rate} - Z_{Rate})$ (15)

[Display Example of Data]

Figure 13:
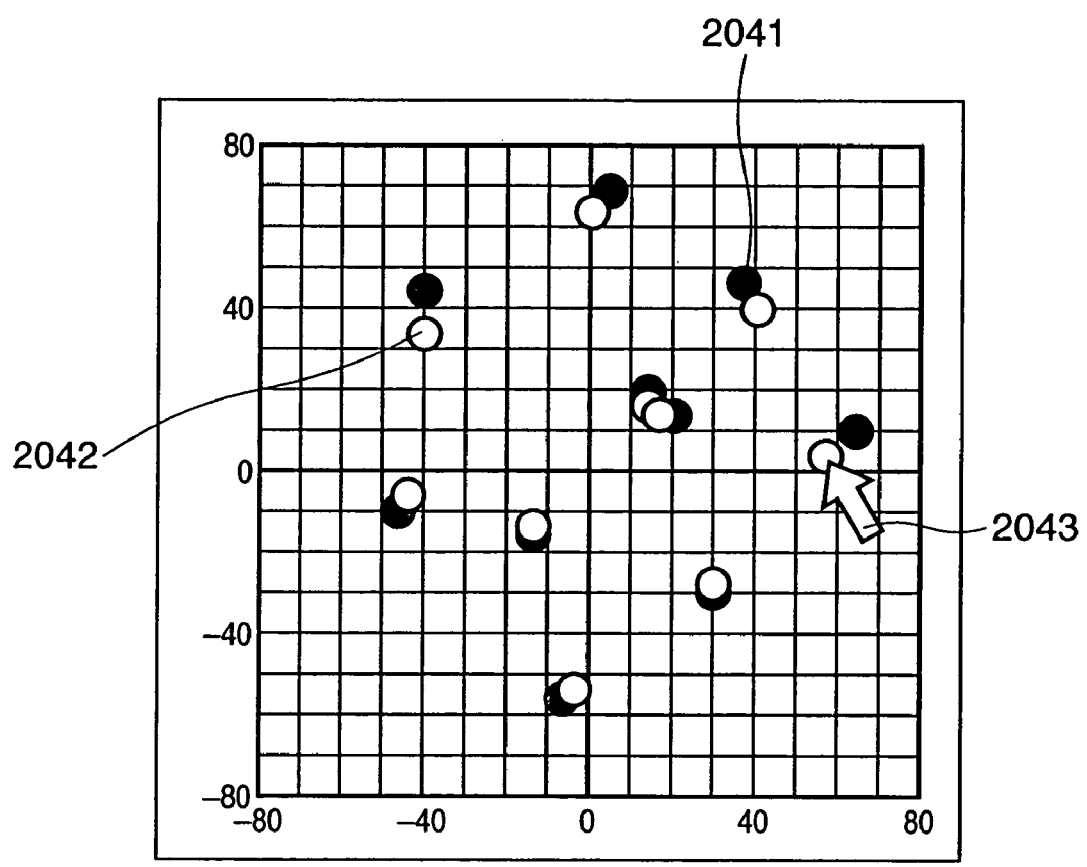
FIG. 13 is a view showing an example of how data is displayed by the changing unit.

FIG. 13 is a view showing an example of how data is displayed by the changing unit 204. The data are mapped to an a*b* plane, L*a* plane, or L*b* plane in the CIE LAB space, and input data 2041 (symbol "●") of each patch and target data 2042 (symbol "○") are displayed as indicated by the symbols "●" and "○" in FIG. 13. The position of the target data 2042 can be changed by using a pointer 2043 corresponding to a pointing device such as a mouse. In consideration of fine edition, it is preferable that the target data selected by the pointer 2043 can be moved on a unit basis, and the coordinates of the input data selected by the pointer 2043 and the coordinates of target data be displayed.

[Relocation Unit]

Figure 14:
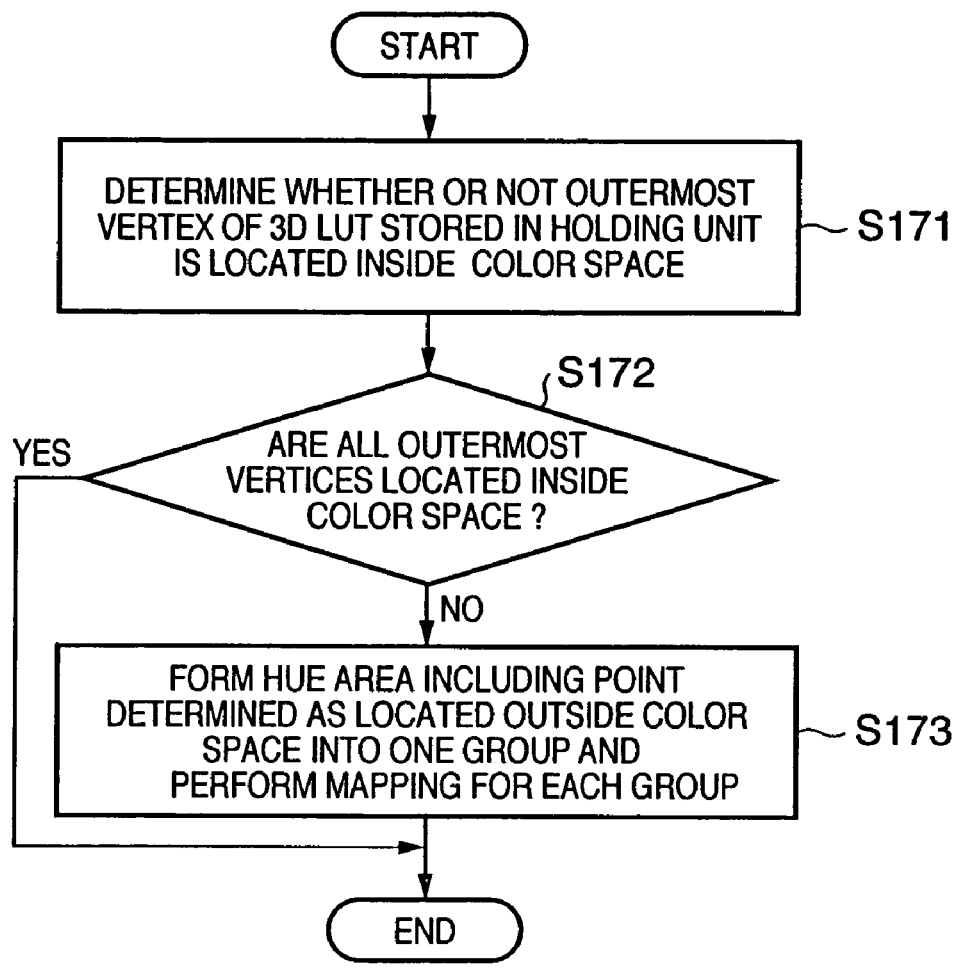
FIG. 14 is a flowchart showing the details of processing by a relocation unit.

FIG. 14 is a flowchart showing the details of the processing (S17) performed by the relocation unit 210.

First of all, of the respective data of the 3D LUT stored in the holding unit 206, the outermost lattice points on the R, G, and B axes indicated by the symbols "●" (the outermost lattice points of primary colors in the space indicated by the 3D LUT) and the points at which C=v(B2+G2), M=v(R2+B2), and Y=v(G2+R2) (the outermost lattice points of secondary colors in the space indicated by the 3D LUT), become maximum are checked one by one to determine whether the lattice points exist in a final target color space (sRGB, AdobeRGB, or the like) (S171). Note that the final target color space corresponds to a color space on which the signal output from the digital camera 1 depends.

Note that the above lattice points are points equivalent to the outermost vertices of the space represented by the 3D LUT excluding the white point (at which W=v(R2+G2+B2) is maximum) and the black point (at which k=v(R2+G2+B2) is minimum), and hence will be referred to as "outermost vertices".

In this determination, when, for example, the final target color space is sRGB, target data is converted from an L*a*b* value defined by CIE LAB into an RGB value in sRGB defined by IEC 61966-2-1 with a white point being D65. Conversion is performed according to the following formula.

CIE LAB→CIE XYZ Conversion $Xn=95.045$ $Yn=100.000$ (16)

$Zn=108.892$ $Y_{Rate} = (L^* + 16.0)/116.0$ $X_{Rate} = a^*/500.0 + Y_{Rate}$ $Z_{Rate} = -b^*/200.0 + Y_{Rate}$ (17)

When $X_{Rate}^3 > 0.00856$, then $X = Xn \times X_{Rate}^3$

When $X_{Rate}^3 \leq 0.00856$, then $X = (X\text{Rate} - 16.0/116.0) \times Xn/7.787$ (18)

When $Y_{Rate}^3 > 0.00856$, then $Y = Yn \times Y\text{Rate}^3$

When $Y_{Rate}^3 \leq 0.00856$, then $Y = (Y\text{Rate} - 16.0/116.0) \times Yn/7.787$ (19)

When $Z_{Rate}^3 > 0.00856$, then $Z = Zn \times Z\text{Rate}^3$

When $Z_{Rate}^3 \leq 0.00856$, then $Z = (Z\text{rate} - 16.0/116.0) \times Zn/7.787$ (20)

CIE XYZ→sRGB Conversion $$\begin{vmatrix} R_{liner} \\ G_{liner} \\ B_{liner} \end{vmatrix} = \begin{vmatrix} 3.2406 & -1.5372 & -0.4986 \\ -0.9689 & 1.8758 & 0.0415 \\ 0.0557 & -0.2040 & 1.0570 \end{vmatrix} \begin{vmatrix} X \\ Y \\ Z \end{vmatrix} \times 100.0 \quad (21)$$

When $R_{liner} \leq 0.0031308$, then $R_{sRGB} = R_{liner}/12.92$

When $R_{liner} > 0.0031308$, then $R_{sRGB} = 1.055 \times R_{liner}^{1.0/2.4} - 0.055$ \hfill (22)

When $G_{liner} \leq 0.0031308$, then $G_{sGGB} = G_{liner}/12.92$

When $G_{liner} > 0.0031308$, then $G_{sRGB} = 1.055 \times G_{liner}^{1.0/2.4} - 0.055$ \hfill (23)

When $B_{liner} \leq 0.0031308$, then $B_{sRGB} = B_{liner}/12.92$

When $B_{liner} > 0.0031308$, then $B_{sRGB} = 1.055 \times B_{liner}^{1.0/2.4} - 0.055$ \hfill (24)

If the computation result on an outermost vertex according to equation (21) is located outside the range defined by inequality (25), it is determined that the point is located outside the color space.

$0.0 \leq R_{liner} \leq 1.0$ $0.0 \leq G_{liner} \leq 1.0$ \hfill (25)

$0.0 \leq B_{liner} \leq 1.0$

If all the determination results on the outermost vertices are located outside the color space (S172), the processing is terminated without any operation. If at least one point is located outside the color space, a hue area containing the outermost vertex determined as located outside the color space is regarded as one group, and mapping described below is performed for each group (S173).

Example of Determination of Movement Amount and Mapping

In the following description, a change in the position of a given lattice point on a color space to another position will be expressed as "movement", and movement of other lattice points on the basis of the moved lattice point will be expressed as "mapping".

Figure 15:
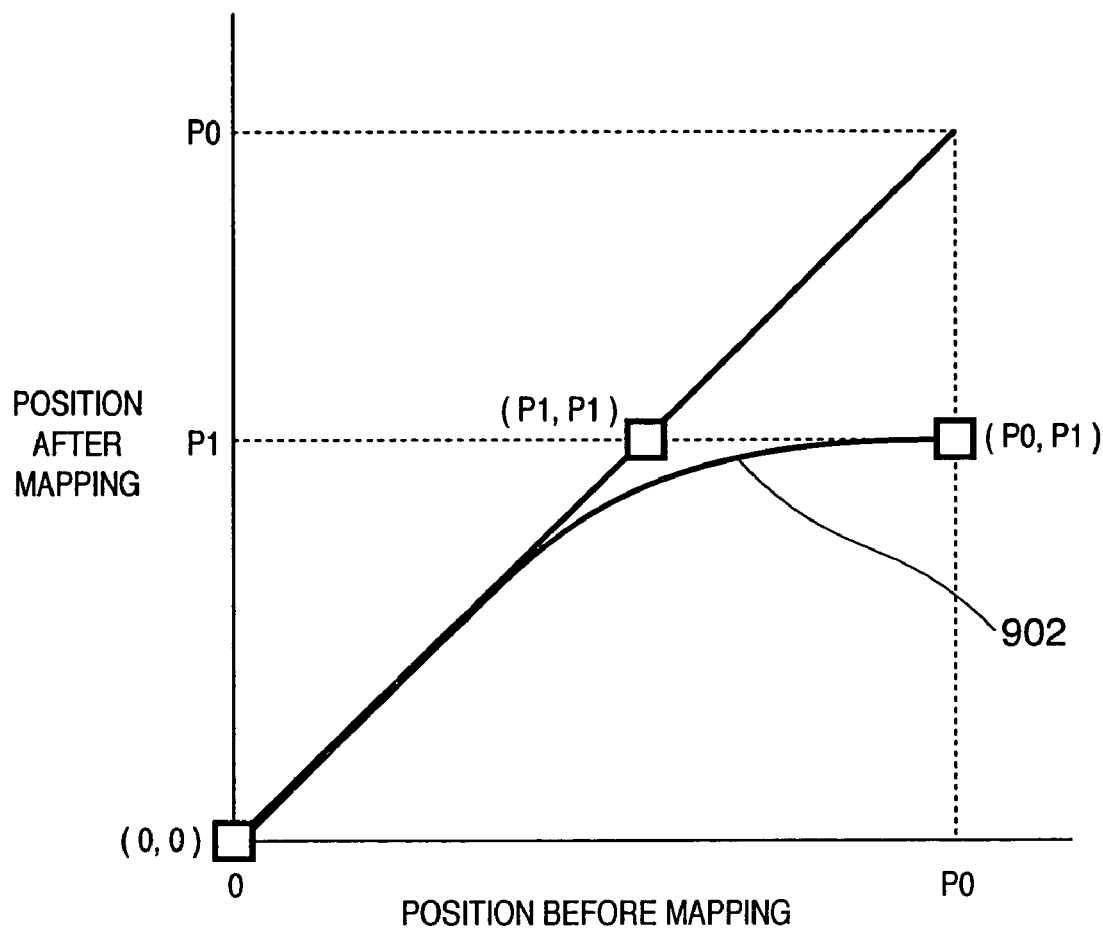
FIGS. 15 to 17 are graphs showing a method of determining the movement amount of each lattice point.
Figure 16:
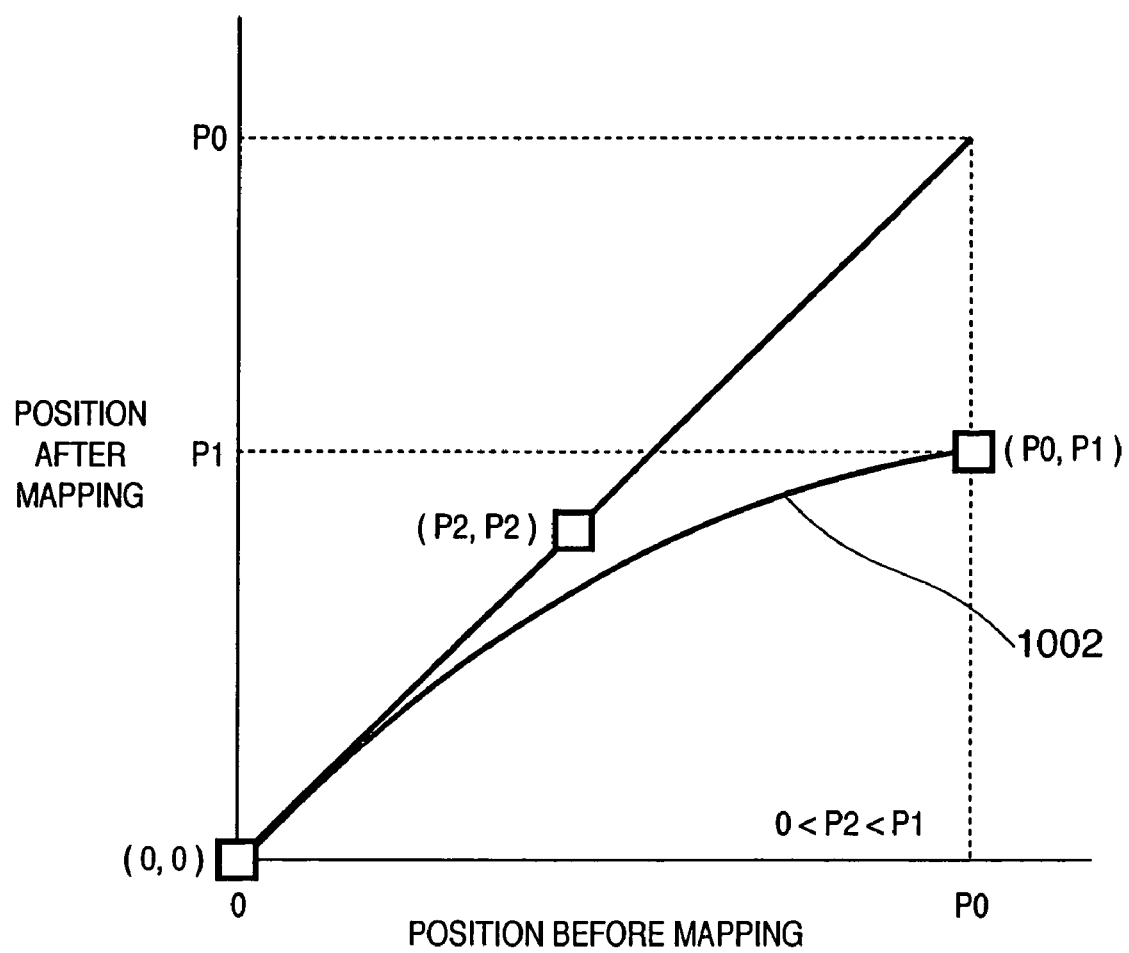
Figure 17:
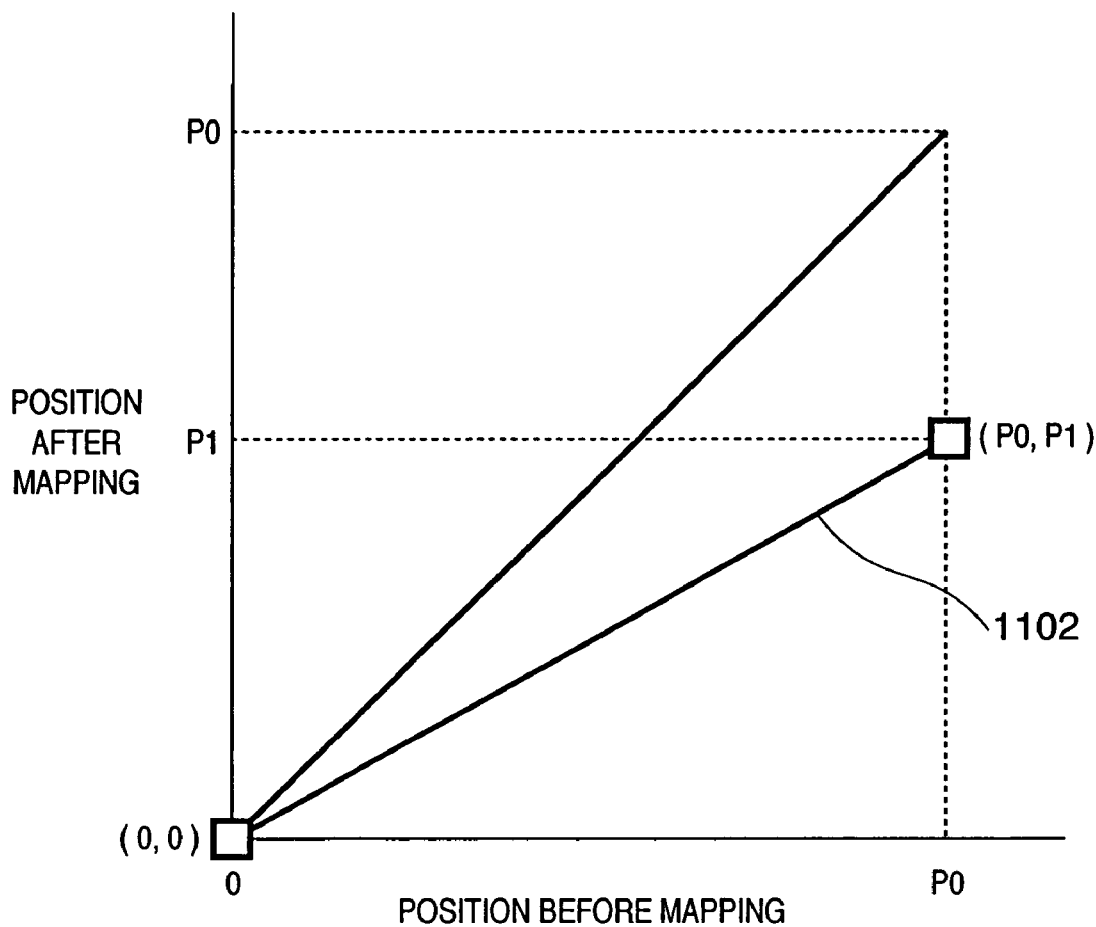

FIGS. 15 to 17 are graphs showing a method of determining the movement amount of each lattice point. As shown in FIG. 15, when a lattice point at a position P0 before movement is to be moved to a position P1 (0≦P1≦P0), a Bezier curve 902 is drawn with reference to three points, i.e., the origin (0, 0), the position (P0, P1 before the movement, and the position (P1, P1 after the movement, and the remaining lattice points are moved to positions after mapping which correspond to the intersections between the Bezier curve 902 and normals extending from the positions of the lattice points before mapping.

FIG. 16 is a graph showing an example in which the overall movement amount at the time of mapping is set to be large. When the origin is (0, 0), an arbitrary position is (P1, P2) (0<P2<P1), and each target data corresponding to each of the arbitrary positions is L*Tia*Tib*Ti, image processing parameters are generated by using the DLS method or the like such that all input data after image processing are brought as close to the corresponding target data as possible. For example, it suffices to calculate image processing parameters which minimize the evaluation function E represented by equation (1).

Figures 18A, 18B, 18C, 18D:
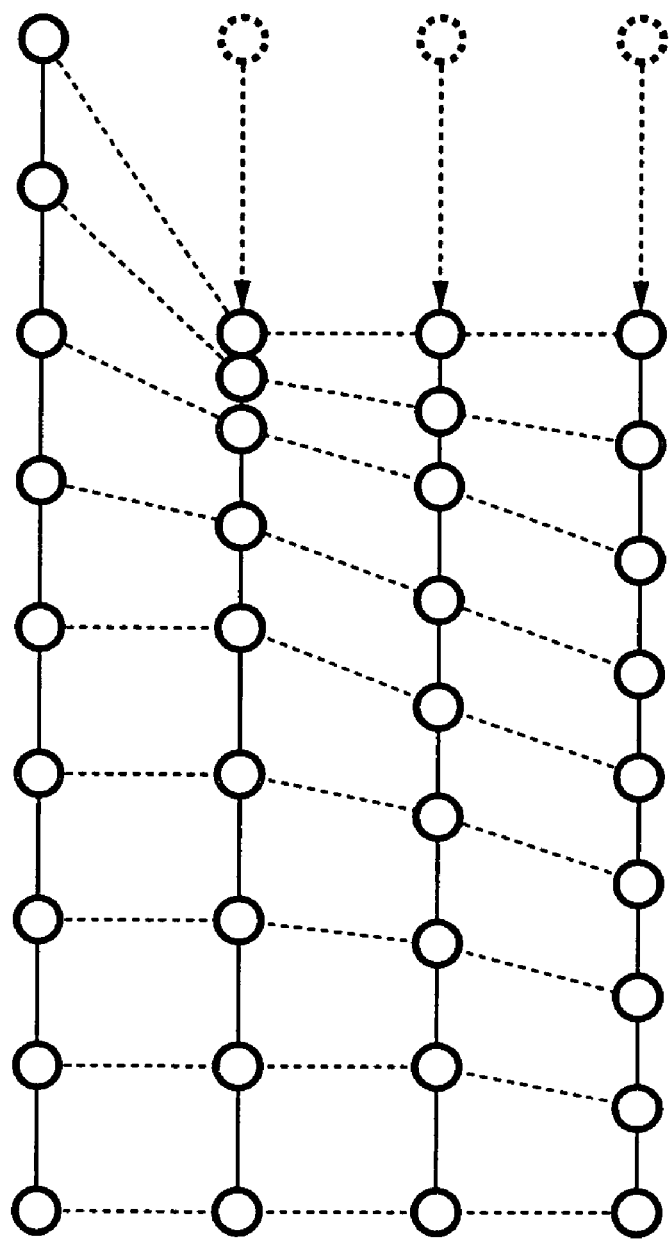
FIGS. 18A to 18D and 19A to 19D are views for explaining how lattice points are moved when mapping is performed one-dimensionally.
Figure 19A:
Figure 19B:
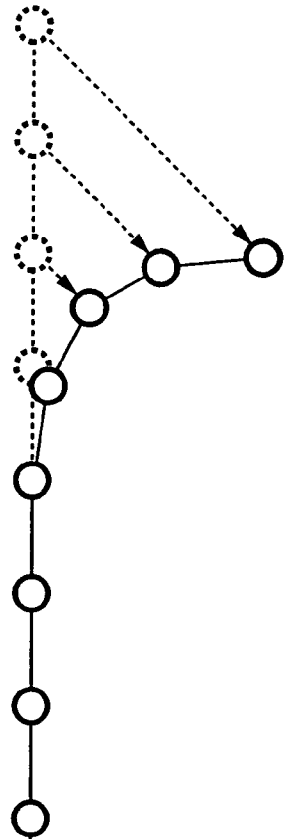
Figure 19C:
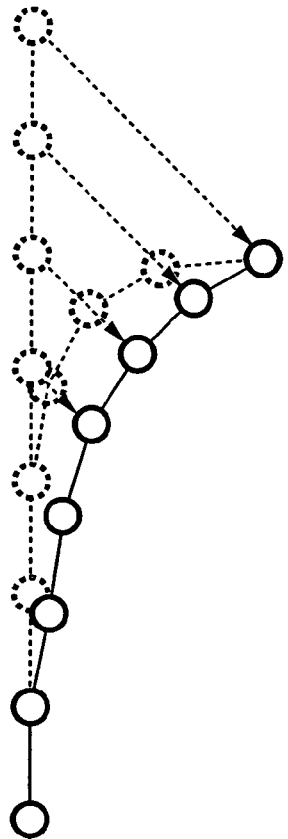
Figure 19D:
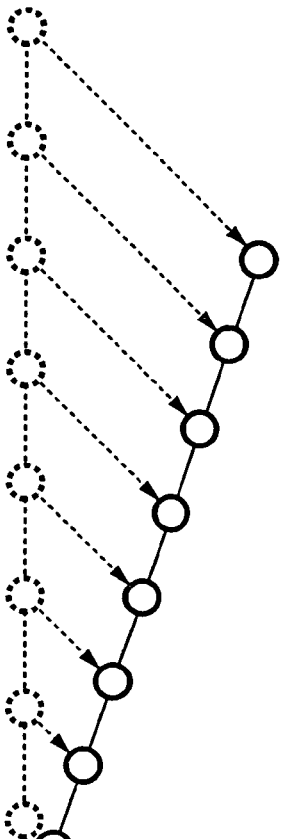

FIGS. 18A to 18D and FIGS. 19A to 19D are views for explaining the movement of lattice points when the above mapping operation is performed one-dimensionally and two-dimensionally. FIGS. 18A and 19A show a state before mapping. FIGS. 18B and 19B show a case wherein mapping is performed by the method shown in FIG. 15. FIGS. 18C and 19C show a case wherein mapping is performed by the method shown in FIG. 16. FIGS. 18D and 19D show a case wherein mapping is performed by the method shown in FIG. 17. Note that the mapping result indicated by the broken lines in FIG. 19C indicates the mapping result obtained by using P2 closer to P1 than P2 in mapping indicated by the solid line.

In this manner, a movement amount is preferably determined differently depending on, for example, the ratio of deformation. More specifically, when the deformation amount is small, the mapping method shown in FIG. 15 is used. As the deformation amount increases, the operation shifts to mapping shown in FIG. 16, and P2 is gradually increased. When the deformation amount is large, linear mapping shown in FIG. 17 is used.

For example, a change in mapping from FIG. 15 to FIGS. 16 and 17 may be made by the following method. For example, the maximum movement amount is equally divided into three ranges. In the movement amount range from 0 to ⅓, mapping in FIG. 15 is used. In the movement amount range from ⅓ to ⅔, mapping in FIG. 16 is used. In the movement amount range from ⅔ to ⅗, mapping in FIG. 17 is used.

FIG. 20A is a view showing an example of how two-dimensionally arranged lattice points are mapped. In this example, for example, while the 10 lattice points on an oblique line 1401 are fixed, a lower right lattice point 1405 is moved, and the remaining lattice points are mapped. In this case, the eight lattice points (denoted by reference numeral 1402) on a low row before mapping and the eight lattice points (denoted by reference numeral 1403) on a right column are mapped upon determining movement amounts according to the methods shown in FIGS. 15 to 17. Thereafter, the lattice points on the oblique columns extending from the upper left to the lower right (each column including one to five lattice points; for example, two points on the column denoted by reference numeral 1404) are mapped upon determining movement according to the methods shown in FIGS. 15 to 17. As a result, a mapping result like that shown in FIG. 20B is obtained.

Figure 21A:
FIGS. 21A and 21B are view showing an example of how mapping is performed when lattice points at the two ends of a row of lattice points are moved.
Figure 21B:
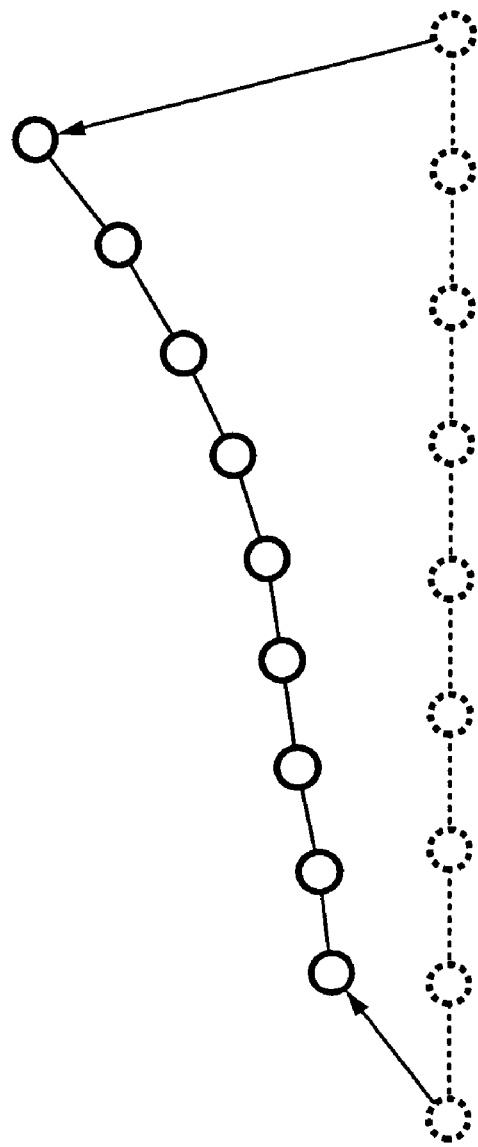

FIGS. 21A and 21B are views showing an example of mapping performed when lattice points at the two ends of a row of lattice points are moved. In this case, the movement amount of each lattice point is calculated when one lattice point is fixed, and the other lattice point is moved. The movement amount of each lattice point is then calculated when the other lattice point is fixed, and one lattice point is moved. Lastly, the movement amounts in the two cases are combined.

Mapping in Three-Dimensional Space

Figure 22:
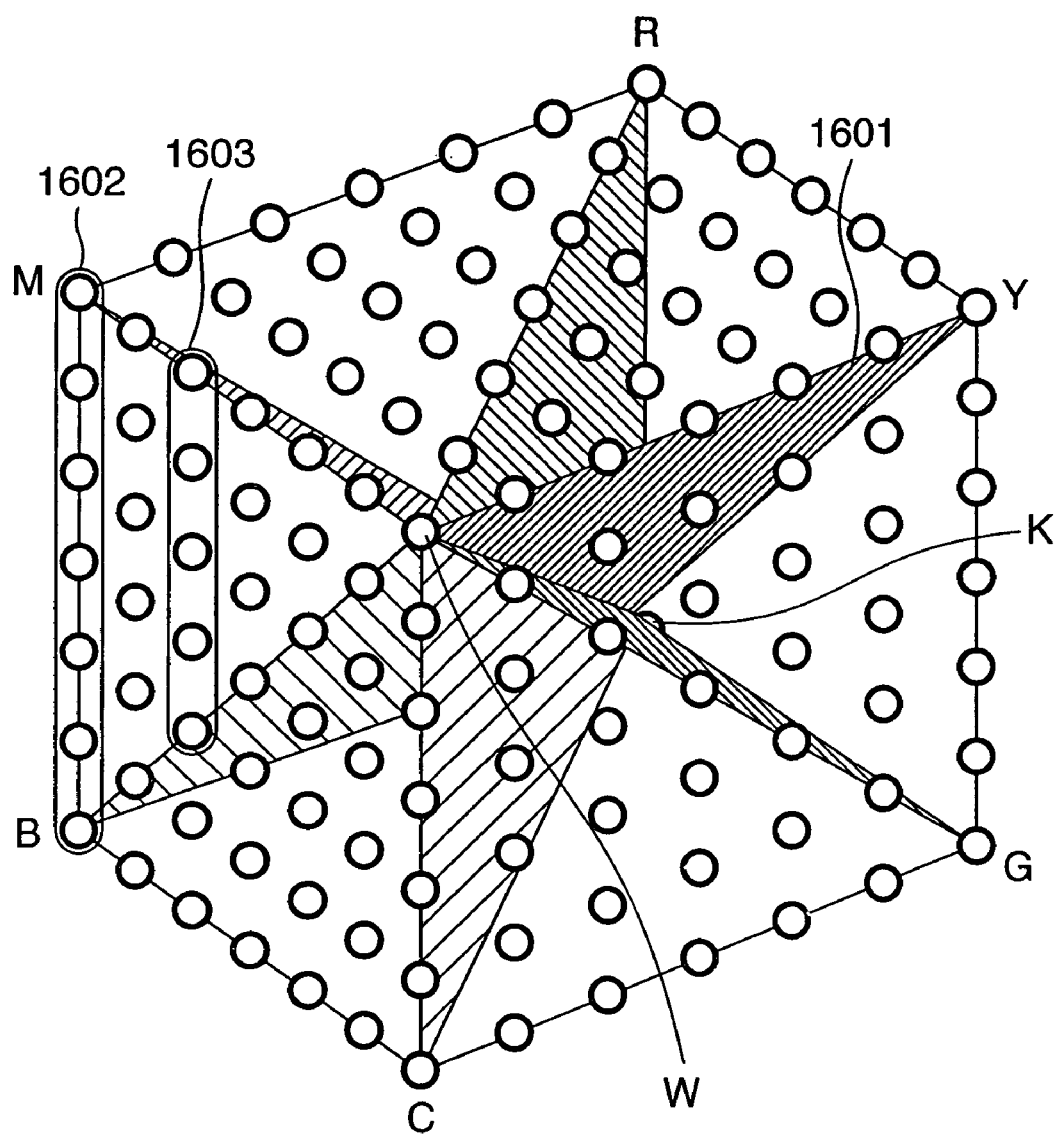
FIG. 22 is a view for explaining a mapping method for lattice points arranged in a three-dimensional space.

FIG. 22 is a view for explaining a mapping method for points arranged in a three-dimensional space.

First of all, the lattice points existing on six triangles (i.e., ΔRWK, ΔGWK, ΔBWK, ΔCWK, ΔMWK, and ΔYWK) each having a gray line WK as a base, which connects a white point (W) and a black point (K), and a corresponding one of the R, G, B, C, M, and Y points (outermost vertices) described above as a vertex. Since the lattice points existing on each triangle are arranged as shown in FIG. 20A, the vertex (R, G, B, C, M, or Y point) denoted by reference numeral 1405 in FIG. 20A is moved to a desired position, and the remaining lattice points are then mapped. Subsequently, in order to map matrices of lattice points which are not included in the respective triangles, they are grouped as indicated by, for example, reference numerals 1602 and 1603. Since the lattice points of the two ends of each line of lattice points are moved, the lattice points other than those at the two ends are mapped by the method described with reference to FIGS. 21A and 21B.

Mapping in Step S173

When mapping is to be performed by the above method, mapping in step S173 is performed as follows.

Consider a triangle having a lattice point, of the outermost vertices R, G, B, C, M, and Y, which is determined as located outside the color space as a vertex and the gray line WK as a base. A vertex (R, G, B, C, M, or Y) of this triangle is moved into the color space, and overall mapping is performed. A position after movement (a position within the color space) is set to "0" if the value of a color component outside the color space is less than 0, and is set to "1" if the value exceeds 1, thereby setting the position of a point obtained as the result of calculating an L*a*b* value again according to mathematical expressions (6) to (15) as a position after movement. Alternatively, a lattice point in the color space which is nearest to a lattice point outside the color space may be set as a lattice point after movement or a lattice point in the color space which is located on a line segment connecting the coordinates (L*, a*, b*) of a lattice point outside the color space and the coordinates (L*, 0, 0) and is nearest to the lattice point outside the color space may be set as a lattice point after movement. After the outermost vertex is moved, the remaining lattice points are mapped by the method described with reference to FIGS. 21A and 21B.

Assume that the user edits target data in this manner, and color processing parameters are edited on the basis of the edition result. In this case, if target data is located outside the final target color space (sRGB, AdobeRGB, or the like), the final image data can be set in the reproduction range of data by relocating the target data (mapping the data in the color space), thereby solving the problem of a so-called color omission error.

Fourth Embodiment

Image processing in the fourth embodiment according to the present invention will be described below. The same reference numerals as in the first and third embodiments denote the same parts in this embodiment, and a detailed description thereof will be omitted.

The third embodiment has exemplified the case wherein mapping itself is automatically performed. In addition to the method of automatically performing mapping, a method of manually performing mapping by using a user interface is available. In this case, the following processing is performed in step S17 described above.

Figure 23:
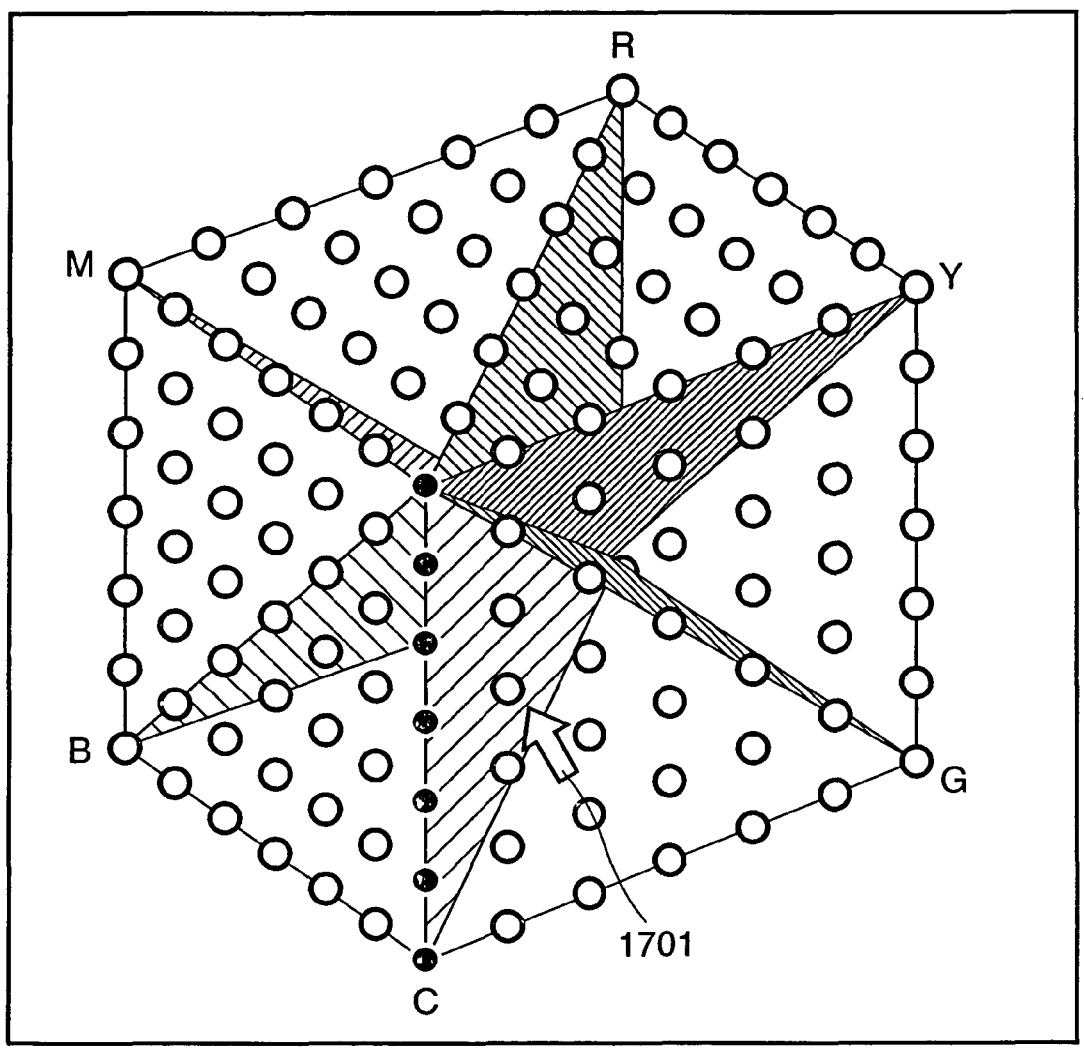

A relocation unit 210 displays the user interface shown in FIG. 23 on a display unit 208 to make a user select one of six triangles each having a gray line WK as a base and one of points R, G, B, C, M, and Y as a vertex. In this case, the user can select a triangle by using a point 1701. Displaying the selected triangle and the remaining triangles in different colors makes it easy for the user to recognize the selected triangle.

When a triangle is selected, the relocation unit 210 displays a user interface like that shown in FIG. 24 on the display unit 208 to allow the user to map the selected triangle. For example, the user moves a vertex (R, G, B, C, M, or Y) of the triangle to a desired position. Although it suffices if at least a vertex is moved, the positions of the remaining lattice points can be finely adjusted with the pointer. In this case, if a lattice point column under fine adjustment is displayed in a color different from that of the remaining lattice point columns like the lattice point column indicated by the symbols "●" in FIG. 24, the user can easily recognize the adjustment state.

It is preferable that a triangle (e.g., ΔRWK) itself be rotated about the gray line WK by using a button 1801 to allow the user to change the hue direction.

Figure 25:
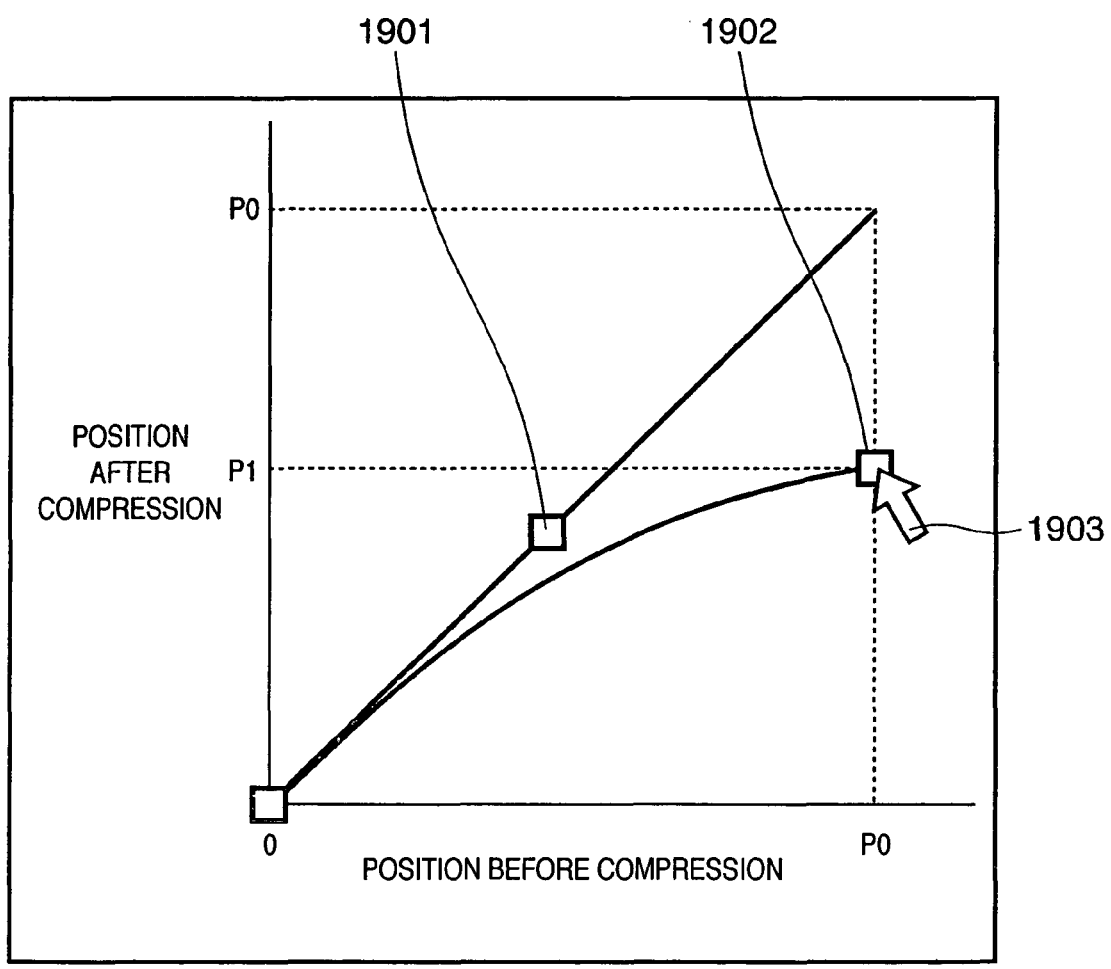

In addition, a movement amount may be determined by displaying a user interface like that shown in FIG. 25 on the display unit 208, together with the user interface shown in FIG. 24, and making the user move a point 1901 with a pointer 1903. Note that a point 1902 is automatically changed in accordance with the position of a lattice point selected with the user interface shown in FIG. 24.

As described above, the same effect as that of the third embodiment can be obtained. In addition, this embodiment notifies the user that target data is located outside the final target color space (sRGB, AdobeRGB, or the like), and allows the user to relocate the target data (map the data in the color space), thereby relocating the target data according to user's preference.

Fifth Embodiment

Image processing according to the fifth embodiment of the present invention will be described below. The same reference numerals as in the first and third embodiments denote the same parts in this embodiment, and a detailed description thereof will be omitted.

[Image Processing Apparatus]

Figure 27:
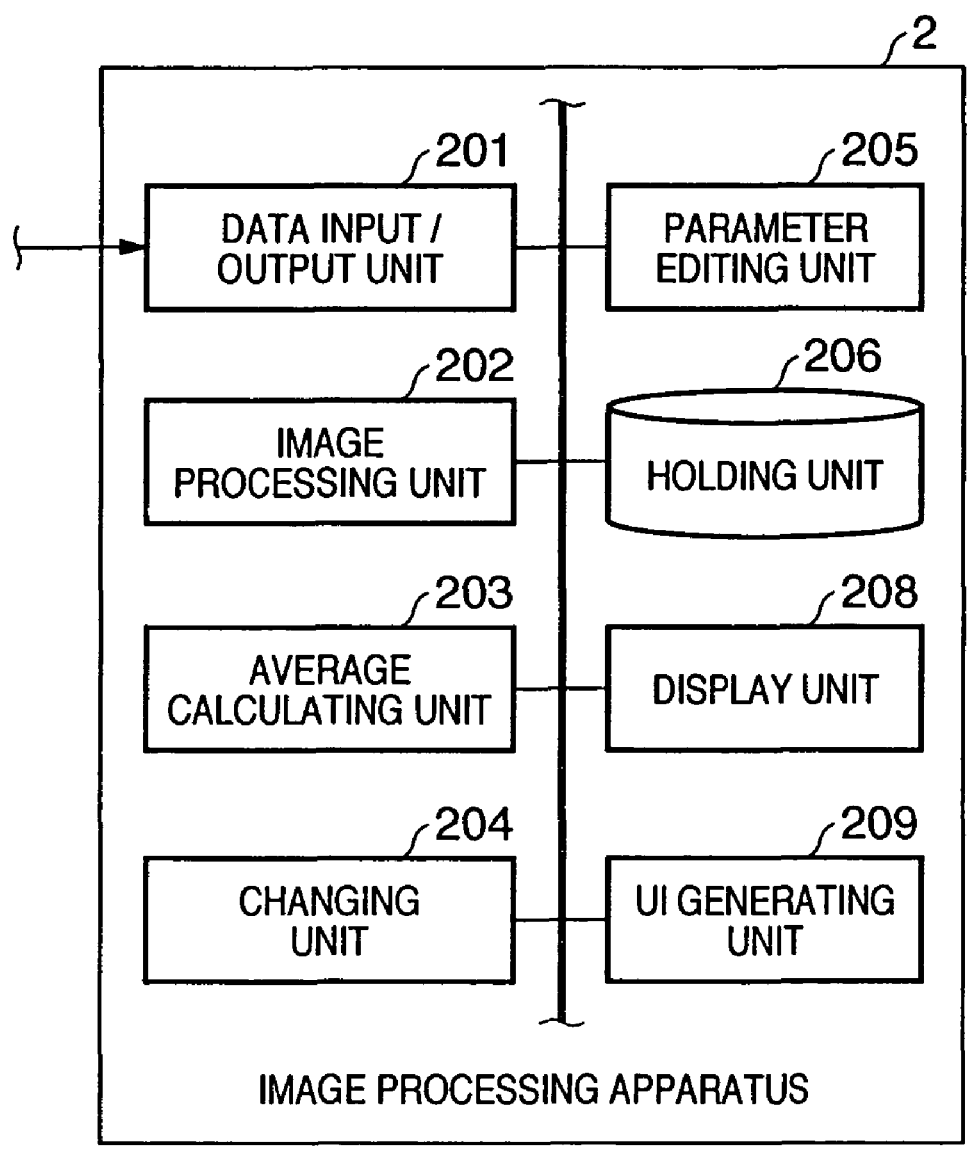
FIG. 27 is a block diagram showing an example of the arrangement of an image processing apparatus according to the third embodiment.

FIG. 27 is a block diagram showing the arrangement of an image processing apparatus 2 according to the fifth embodiment. As compared with the arrangement of the image processing apparatus 2 according to the third embodiment shown in FIG. 10, the image processing apparatus 2 according to the fifth embodiment does not include the relocation unit 210 but includes a user interface (UI) generating unit 209 which generates a user interface for allowing a user to select an arbitrary image processing method and edit an image processing method, and displays the interface on a display unit 208. Note that image processing parameters (to be described later) which are used by an image processing unit 202 for image processing are stored in a holding unit 206.

Figure 28:
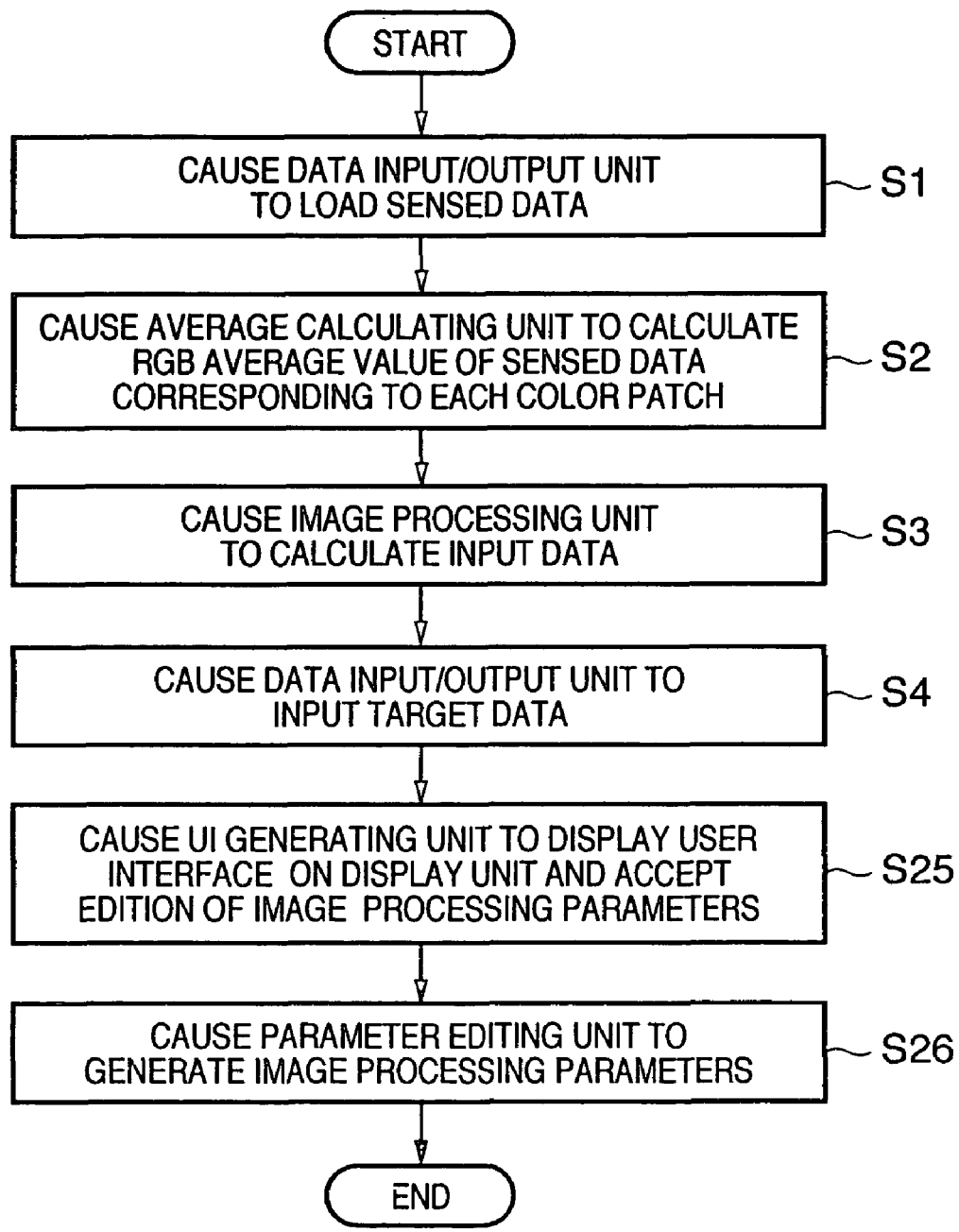
FIG. 28 is a flowchart showing the flow of processing in the image processing apparatus according to the third embodiment.

FIG. 28 is a flowchart showing the flow of processing in the image processing apparatus 2 according to the fifth embodiment.

The processing in step S1 to step S4 is the same as that in the image processing apparatus 2 according to the first embodiment shown in FIG. 3. Although described in detail later, the UI generating unit 209 displays a user interface on the display unit 208 and accepts edition of image processing parameters (S25), and a parameter editing unit 205 generates image processing parameters (S26), thereby terminating the processing.

[Method of Editing Image Processing Parameters]

Figure 29:
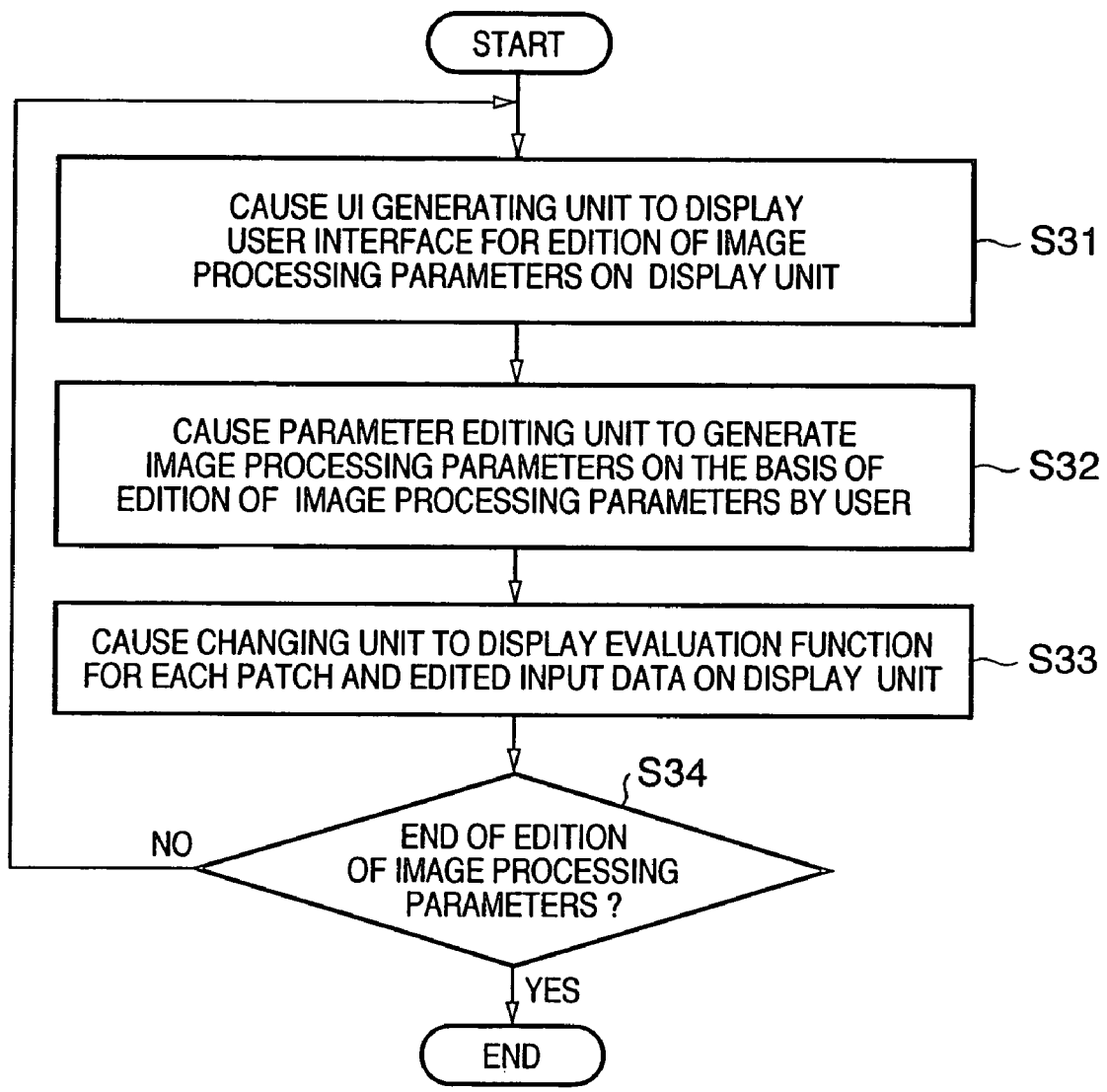
FIG. 29 is a flowchart for explaining editing processing of image processing parameters which is executed by a UI generating unit, changing unit, and parameter editing unit.

FIG. 29 is a flowchart for explaining editing processing (S25, S26) of image processing parameters which is executed by the UI generating unit 209, a changing unit 204, and the parameter editing unit 205.

First of all, the UI generating unit 209 displays a user interface for editing image processing parameters on the display unit 208. The details of the user interface will be described later. The user edits image processing parameters by operating the displayed user interface, as needed (S31).

Figure 30:
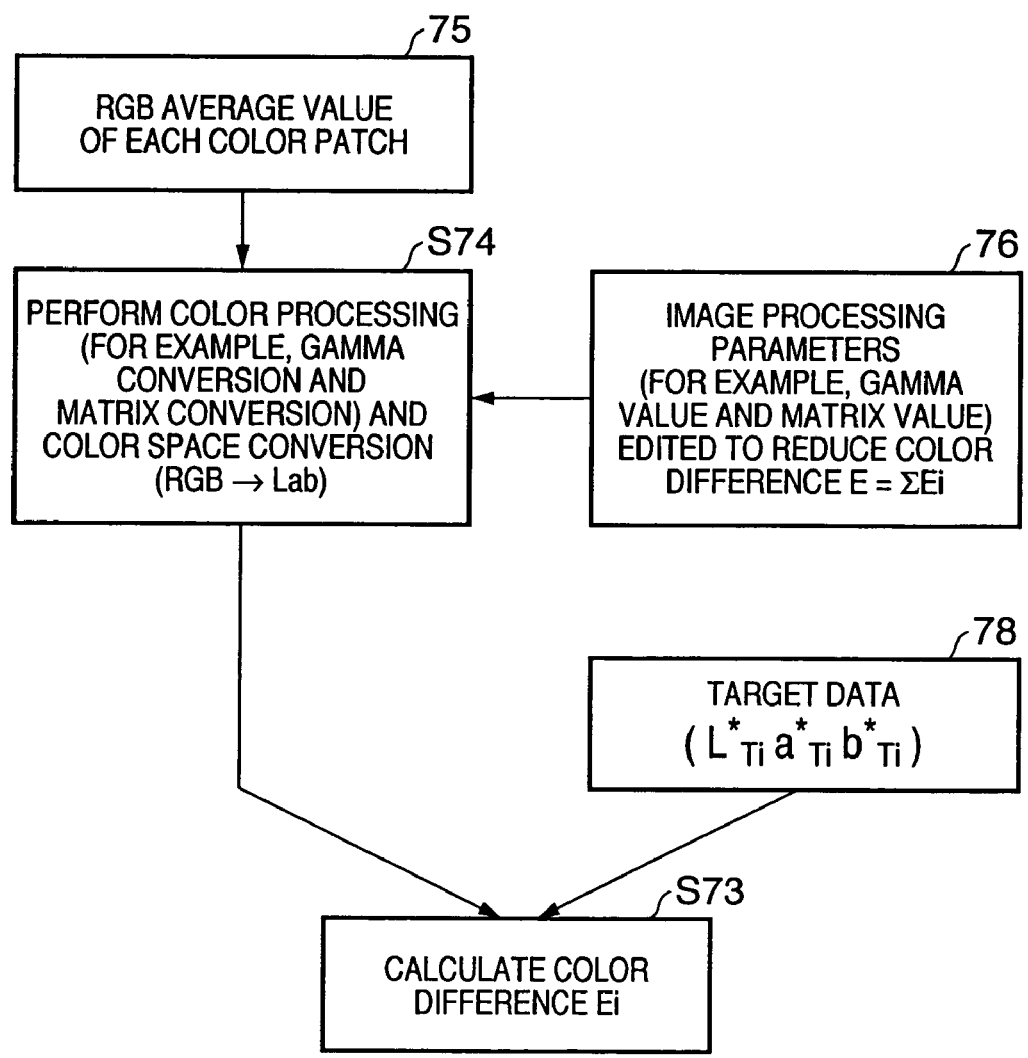
FIG. 30 is a flowchart for explaining the edition of image processing parameters.

The parameter editing unit 205 generates image processing parameters by performing optimization processing of the image processing parameters edited by the user as initial values (S32). In this generation processing, in the flow of processing shown on the left side of FIG. 30, the data obtained by performing color conversion and CIE LAB conversion (S74) of each input data 75 is set as $L^*_i a^*_i b^*_i$, and each corresponding target data 78 is set as $L^*_{Ti} a^*_{Ti} b^*_{Ti}$, and image processing parameters are generated by using the DLS method or the like so as to bring all the input data after image processing as close to the corresponding target data as possible. For example, image processing parameters may be so calculated as to minimize an evaluation function E represented by equation (1).

The changing unit 204 then displays an evaluation function Ei for each patch and the evaluation function E on the display unit 208, and supplies the generated image processing parameters to the image processing unit 202 to make the image processing unit 202 perform image processing of the sensed data which is input in step S1 and stored in the holding unit 206. The changing unit 204 displays the resultant edited input data on the display unit 208 (S33). In this case, for example, as shown in FIG. 5, target data, edited input data, weight values Wi, and evaluation functions Ei for the respective patches are displayed in the form of a table, and the evaluation function E is lastly displayed. This makes it easy for the user to determine the edition result on the image processing parameters.

The changing unit 204 prompts the user to determine whether to finish edition of image processing parameters on the basis of the evaluation function Ei for each patch, calculated in step S33, the evaluation function E, and the image displayed on the display unit 208 (S34). When the user inputs information indicating the determination through the user interface, the flow returns to step S31 if the edition of image processing parameters is continued. If the edition is to be finished, the processing is terminated.

[User Interface]

FIGS. 31 to 34 are views showing the user interfaces which are generated by the UI generating unit 209 and displayed on the display unit 208. In the following description, each color of image data is comprised of eight bits. However, the present invention can be equally applied to a case wherein each color is comprised of 10 bits or 12 bits. In addition, a case wherein image processing parameters are automatically optimized by using a user interface will also be described below. This automatic optimization is the operation of evaluating the relationship between color data and target data in accordance with an evaluation function, and adjusting image processing parameters (matrix conditions such as a gamma function and matrix coefficients for matrix computation) so as to minimize the evaluation function.

Figure 31:
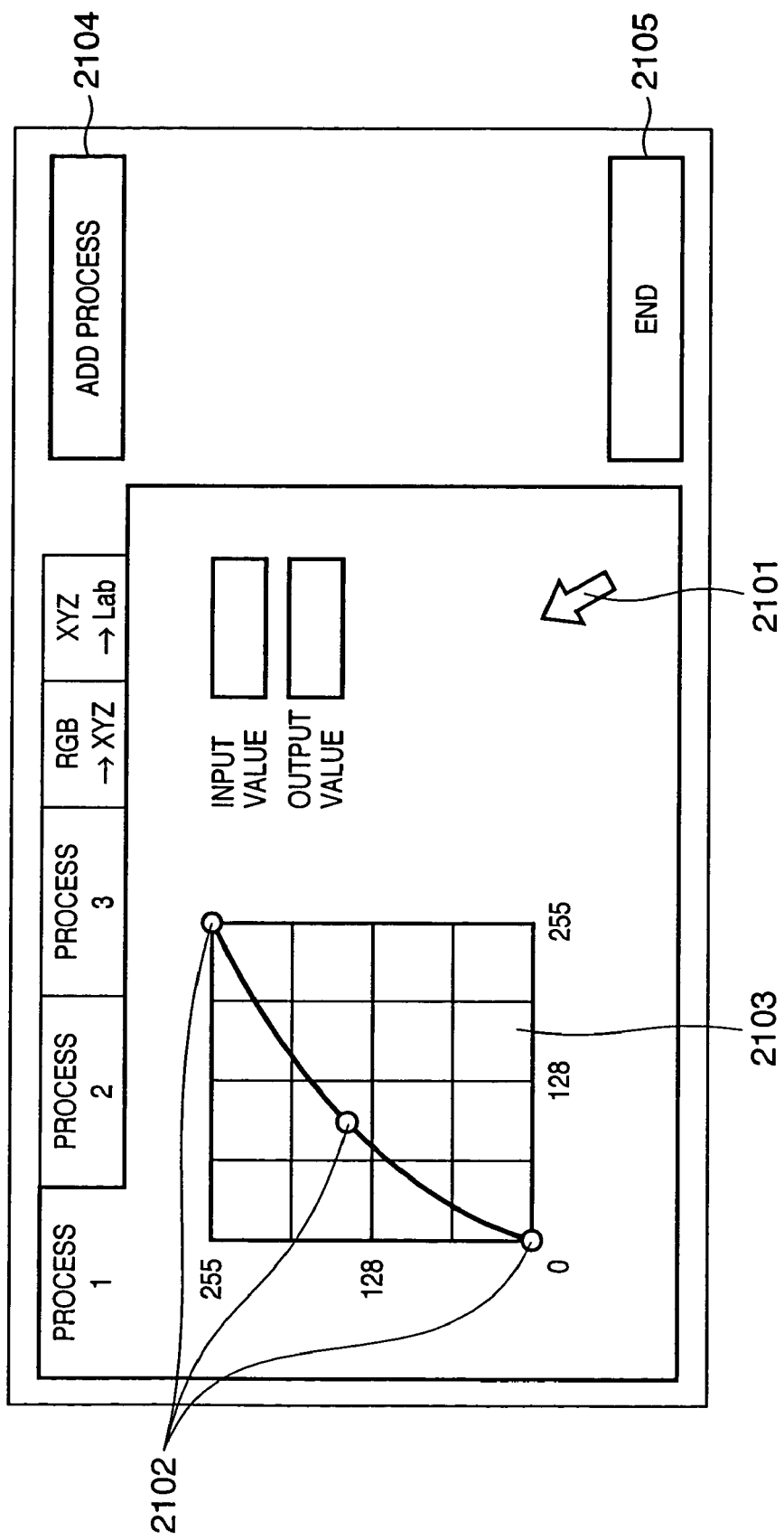
FIGS. 31 to 34 are views showing the user interfaces generated by the UI generating unit and displayed on a display unit.

FIG. 31 shows a user interface for the edition of a gamma function. According to this user interface, with respect to the range of input values (0 to 255), outputs can also be set in the same range (0 to 255). In the initial state of this user interface, an output value is equal to an input value, and hence a gamma function is expressed as a line segment connecting the coordinates (0, 0) and the coordinates (255, 255).

The user selects one of sample points 2102 on the gamma function by using a pointer 2101, and drags the selected sample point 2102. In accordance with this user operation, the changing unit 204 computes a spline curve which smoothly connects the sample points 2102. The UI generating unit 209 displays the computed spline curve on the user interface. Note that the user can add a sample point at an arbitrary position on the gamma function by clicking the position, and can delete the sample point 2102 by dragging it out of a gamma function setting range 2103. When the user presses an "end" pointer 2105 after obtaining a desired curve as a gamma function, information representing the spline curve computed by the changing unit 204 is transferred to the parameter editing unit 205. The parameter editing unit 205 generates a lookup table for gamma conversion and stores it in the holding unit 206.

When the user presses an "add process" button 2104, a new editing process can be added at an arbitrary position, for example, a position between the "process 1" tag (corresponding to the edition of a gamma function in FIG. 31) and the "process 2" tag.

Figure 32:
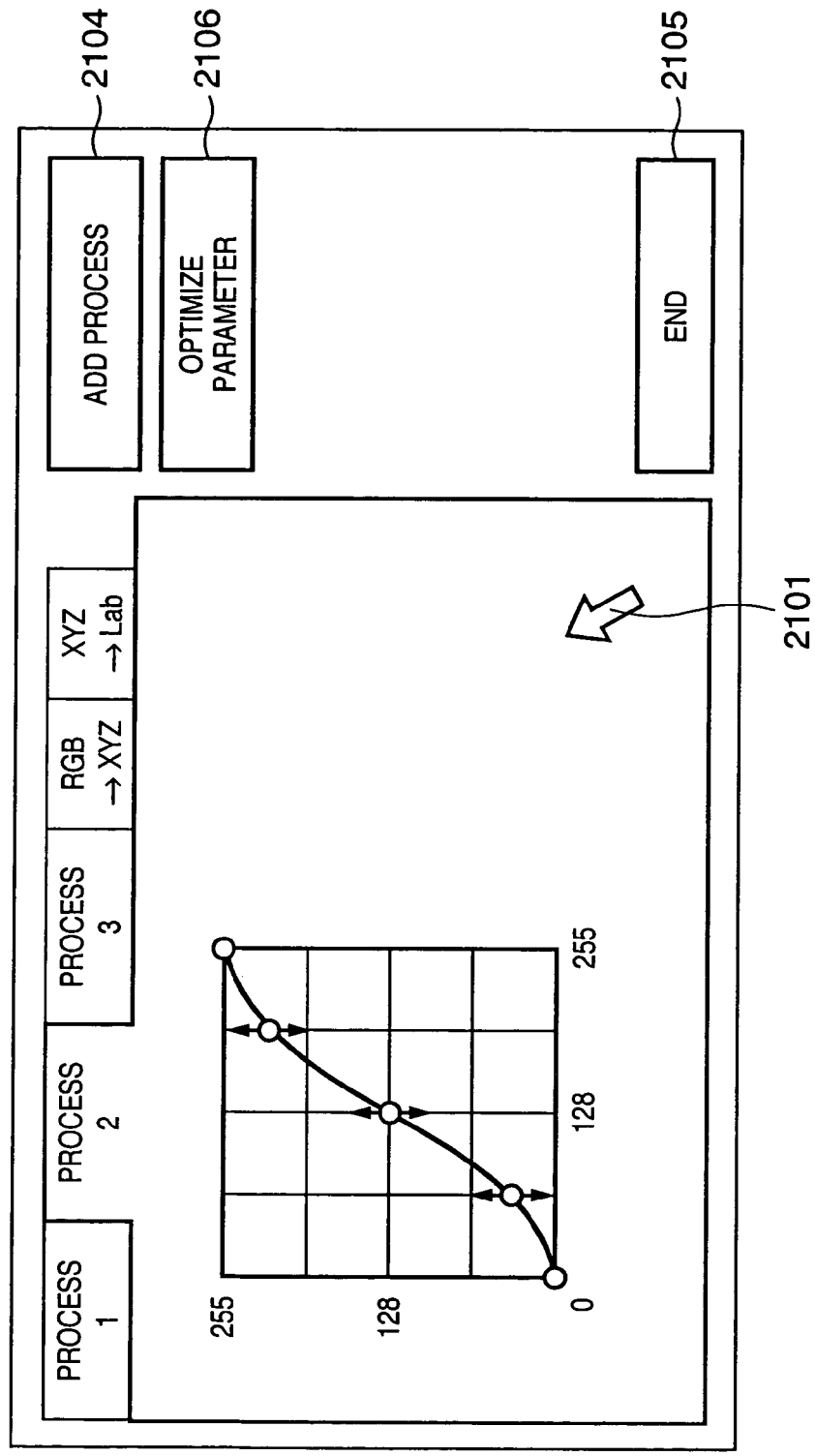

FIG. 32 shows a user interface for the edition of a gamma function like FIG. 31. According to this user interface, a gamma function can be automatically optimized. In this case, sample points of input values are fixed to 0, 64, 128, 192, and 255, and output values at three points excluding 0 and 255 are optimized between 0 to 255. When the user presses an "optimize parameter" button 2106, the parameter editing unit 205 executes optimization of a gamma function, generates a lookup table for gamma conversion or the like, and stores it in the holding unit 206.

Figure 33:
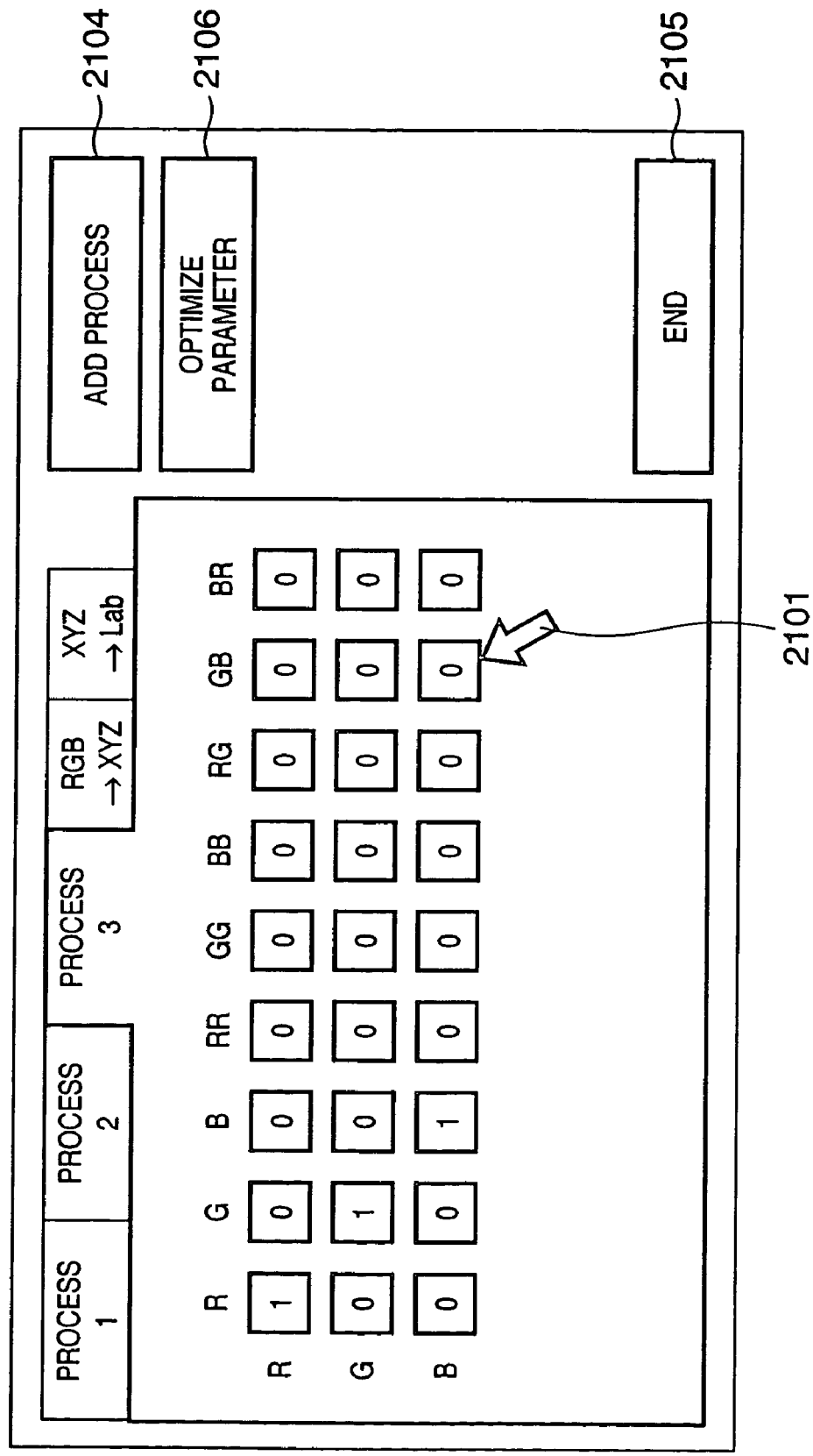

FIG. 33 shows a user interface for the edition of matrix computation such as color processing. With this user interface, the user can set, for example, matrix coefficients for a 3×9 matrix. Of the initial values of matrix coefficients, the values on the 3×3 portion on the left are set to unit matrices, and the remaining values are set to "0". The user selects a matrix coefficient with the pointer 2101 and sets a desired value. When the user presses the "optimize parameter" button 2106, the parameter editing unit 205 executes optimization of the matrix coefficient and stores the obtained matrix coefficient in the holding unit 206.

Figure 34:
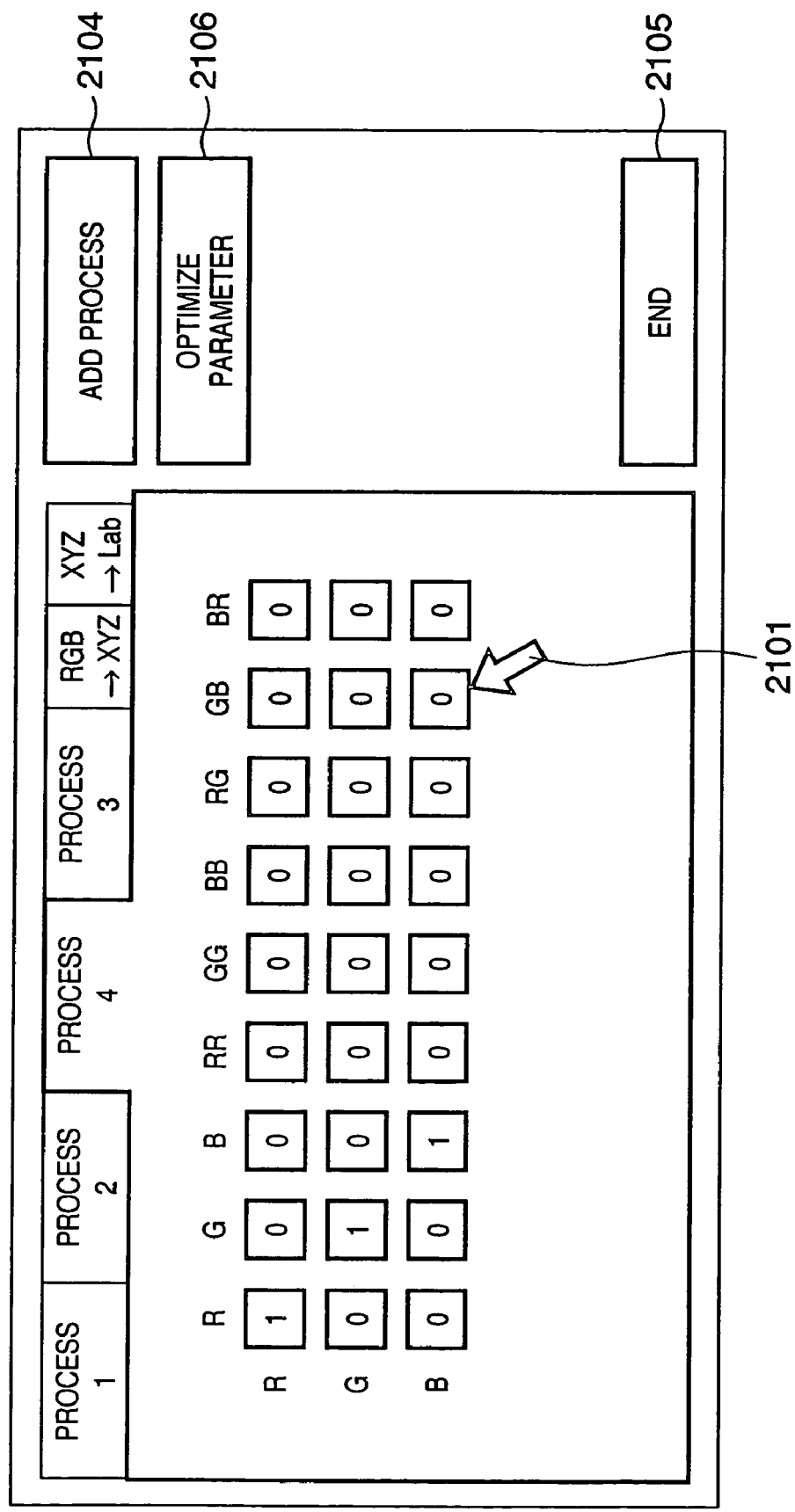

An example of how a computation process is added will be described with reference to FIGS. 34 and 37.

Figure 37:
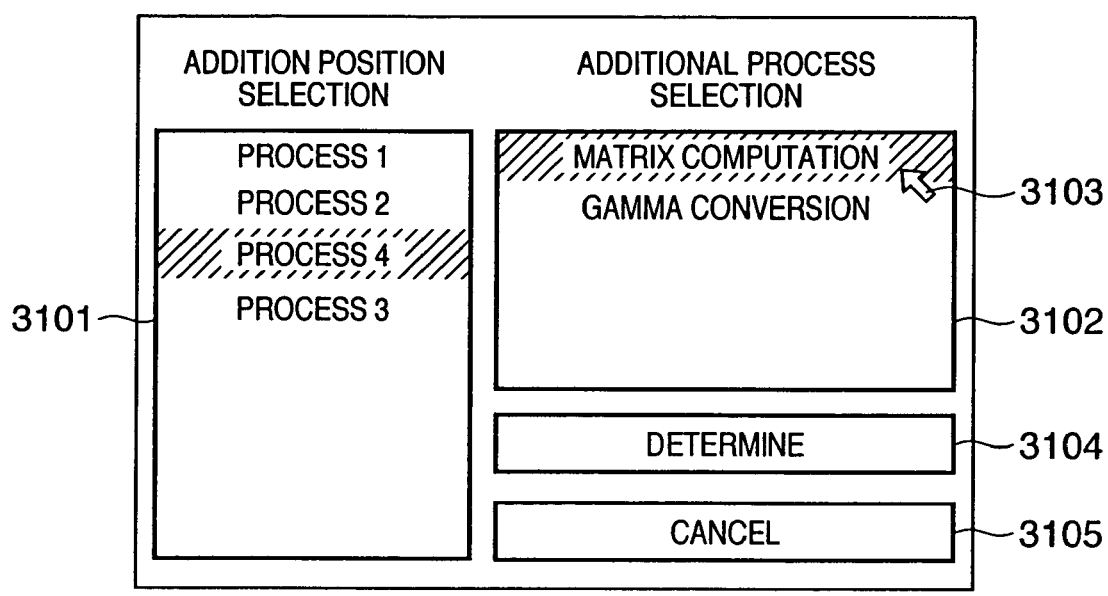
FIG. 37 is a view showing a user interface generated by a UI generating unit and displayed on a display unit.

First of all, the user presses the "add process" button 2104 to display a user interface like that shown in FIG. 37. The user then selects a position at which a process is added by an addition position selecting unit 3101 by using a pointer 3103, and selects a process to be added by an additional process selecting unit 3102 by using the pointer 3103. When a decision button 3104 is pressed afterward, process 4 is added between process 2 and process 3 as shown in, for example, FIG. 34. Note that when the addition of the process is to be canceled, a cancel button 3105 is pressed.

Figure 35:
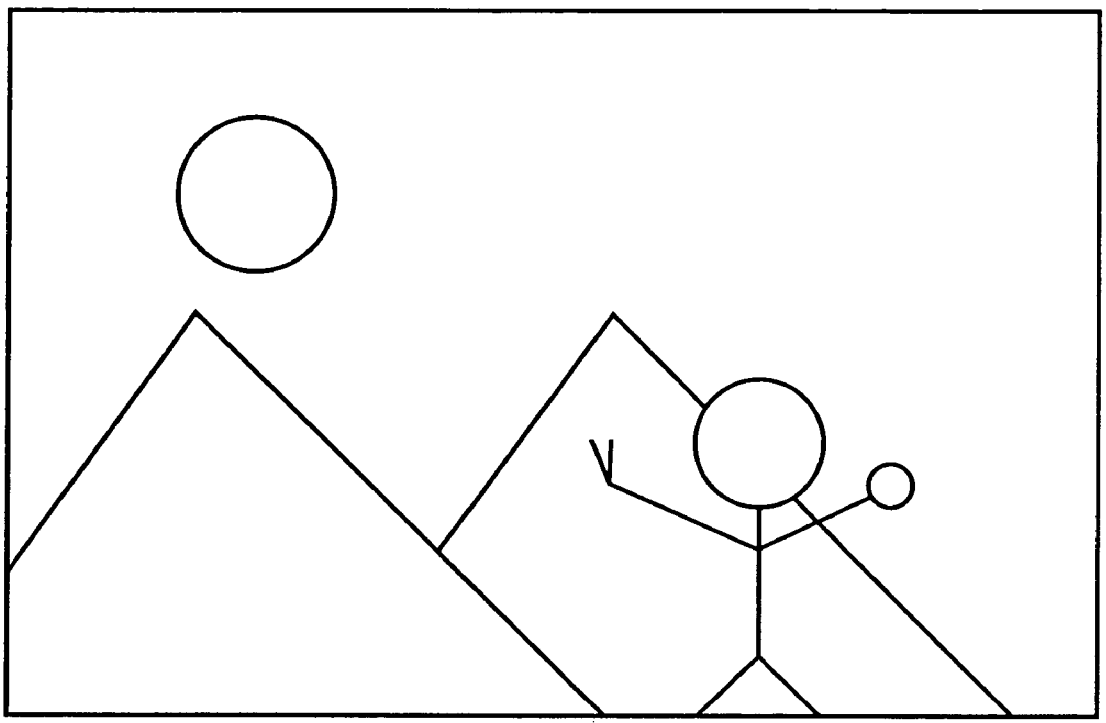
FIG. 35 is a view showing an example of an actually photographed image.

The changing unit 204 cannot only display an evaluation function for each patch and edited input data (evaluation information) in step S33, but also display, on the display unit 208, the image obtained by performing image processing of an actually photographed image like that shown in FIG. 35 with image processing parameters under edition as evaluation information, thereby allowing the user to make evaluation on the basis of not only the color differences from the targets but also the actually photographed image. In this case, after the "end" button 2105 of the user interface shown in FIGS. 31 to 34 is pressed, the UI generating unit 209 may display a user interface (not shown) for the selection of evaluation information on the display unit 208, and notify the changing unit 204 of the selection by the user.

In this manner, the contents of complicated matrix computation or image processing can be edited by using a user interface. Image processing parameters can be generated on the basis of the edition result on the contents of image processing, e.g., matrix conditions (matrix coefficients, matrix size, and the like) and a gamma function. In addition, image processing parameters can be optimized to minimize the differences between target data and the result obtained by performing image processing of input color data by using generated image processing parameters.

Sixth Embodiment

Image processing according to the sixth embodiment of the present invention will be described below. The same reference numerals as in the first and third embodiments denote the same parts in this embodiment, and a detailed description thereof will be omitted.

Figure 36:
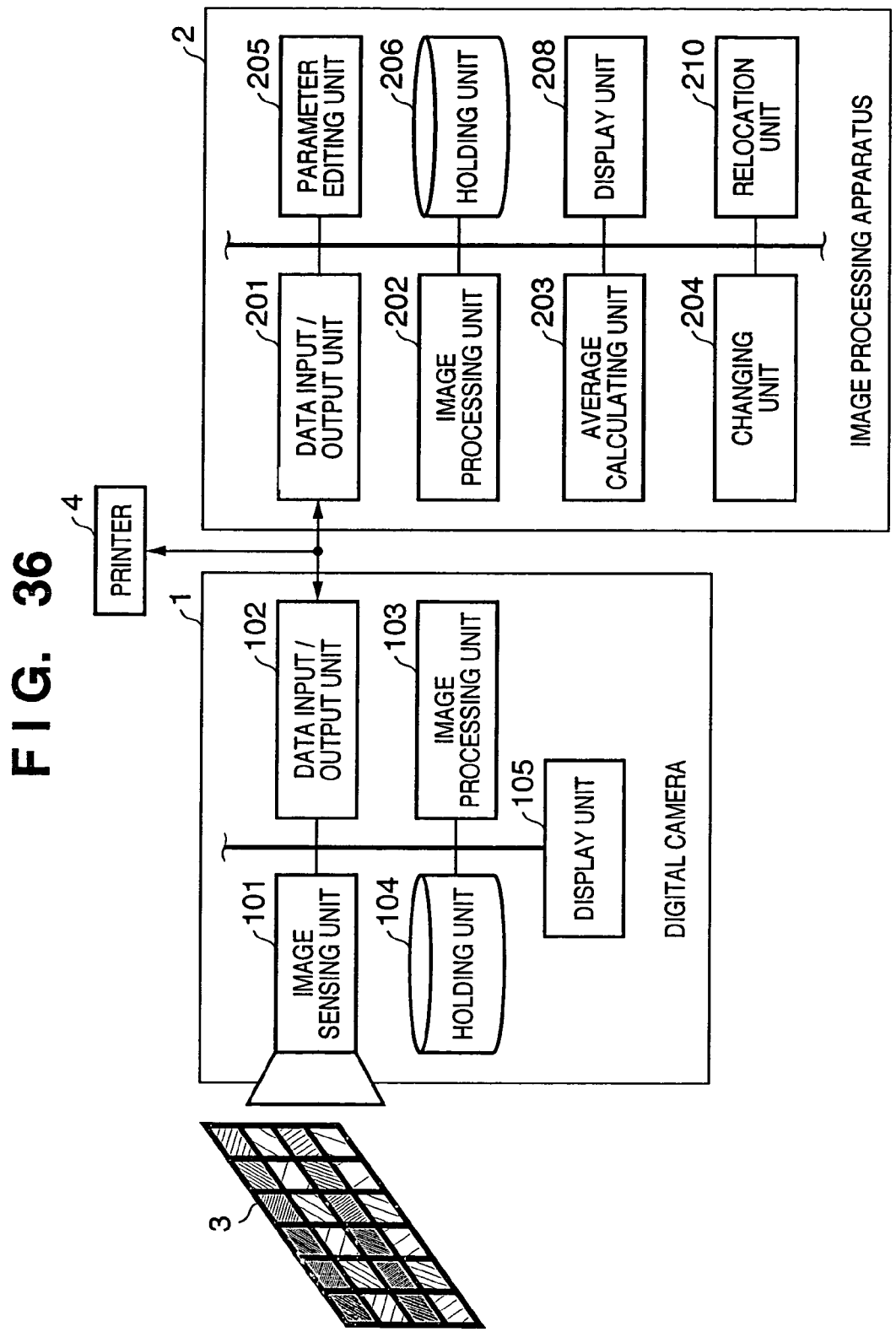
FIG. 36 is a block diagram showing the arrangement of a system according to the fourth embodiment.

FIG. 36 is a block diagram showing the arrangement of a system according to the sixth embodiment. As compared with the arrangement of the system according to the third embodiment shown in FIG. 10, the sixth embodiment additionally includes a printer 4 as a typical image output apparatus. The printer 4 forms an image or the like output from a digital camera 1 or image processing apparatus 2 as a visible image on a recording medium such as a recording sheet. Note that the image output apparatus is not limited to a printer and may include a photographic printing apparatus which forms an image on photographic paper, a film scanner which forms an image on a film, a CRT, a liquid crystal panel, a monitor which displays an image by using a plasma panel, and the like.

A relocation unit 210 in the image processing apparatus 2 of the sixth embodiment determines whether or not target data is included in a predetermined area (e.g., the color reproduction range of the printer 4), and relocates target data located outside the range into the range.

The image processing apparatus 2 of the sixth embodiment executes almost the same processing as that shown in FIG. 11. When input data is to be obtained from an image processing unit 202 in step S3, however, RGB data after image processing is assumed to be Wide Gamut RGB, and is converted into CIE LAB data with a white point-being D50, and the CIE LAB data is set as input data. In step S17, the 3D LUT generated by the relocation unit 210 is looked up, and it is checked whether or not target data is included in a predetermined area (e.g., the color reproduction range of the printer 4). If the target data is not included in the range, relocation is performed.

The following is an example of a Wide Gamut RGB→CIE XYZ conversion formula used for Wide Gamut RGB→CIE LAB conversion. Note that the CIE XYZ→CIE LAB conversion formula has been described in the third embodiment, and hence a description thereof will be omitted.

Wide Gamut RGB→CIE XYZ Conversion

When $R_{sRGB} \leq 0.04045$, then $R_{liner} = R_{sRGB}/12.92$

When $R_{sRGB} > 0.04045$, then $R_{liner} = \{(R_{sRGB}+0.055)/1.055\}^{2.4}$ (24)

When $G_{sRGB} \leq 0.04045$, then $G_{liner} = G_{sRGB}/12.92$

When $G_{sRGB} > 0.04045$, then $G_{liner} = \{(G_{sRGB}+0.055)/1.055\}^{2.4}$ (25)

When $B_{sRGB} \leq 0.04045$, then $B_{liner} = B_{sRGB}/12.92$

When $B_{sRGB} > 0.04045$, then $B_{liner} = \{(B_{sRGB}+0.055)/1.055\}^{2.4}$ (26)

Figure 26:
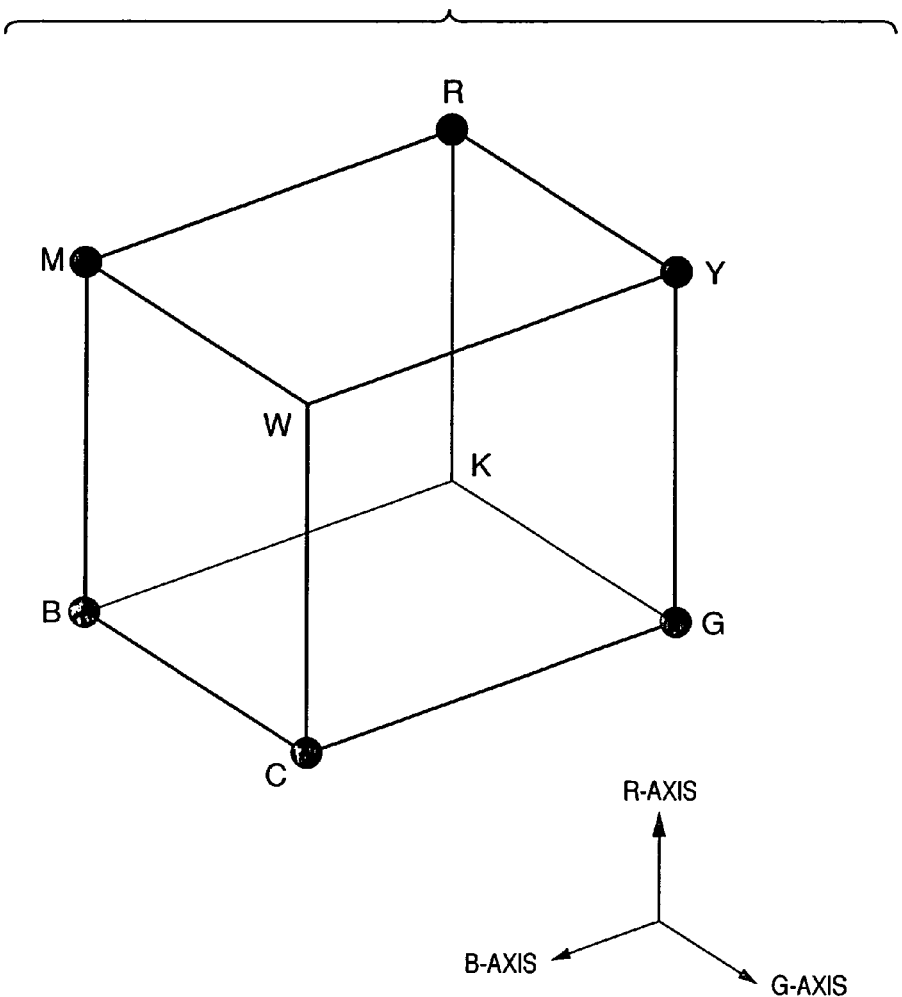
FIG. 26 is a view for explaining outermost vertices.

In the processing performed by the relocation unit 210 in step S17, the outermost lattice points indicated by the symbol "●" in FIG. 26, of the data in the 3D LUT stored in a holding unit 206, are checked one by one to determine whether each of these lattice points is located inside or outside a final target color space (e.g., the color reproduction range of the printer 4) (S171). The final target color space corresponds to a color space on which a signal output from the digital camera 1 depends.

The color reproduction range of the printer 4 is acquired in the following manner. First of all, the printer 4 supplies the patch data of a reproducible range (patch data obtained by assigning (R, G, B)=(0, 0, 0) to (255, 255, 255) to input data) to the printer 4. The color patches which are printed by the printer 4 while its color correction mode is turned off are subjected to colorimetry by GretagMacbeth SpectroLino or the like to obtain Lab values. The color space formed by the acquired Lab values is then set as the color reproduction range of the printer 4.

By changing the arrangement and processing of the third embodiment in the above manner, the color reproduction range of image data output from the digital camera 1 can be arbitrarily set to, for example, the color reproduction range of the printer 4 without being influenced by a color reproduction range such as sRGB or AdobeRGB. In addition, the color reproduction range of image data can be set to a final target color space (e.g., the color reproduction range of the printer 4). In addition, a 3D LUT can be obtained, which can prevent a color omission error in image data color-converted into a final target color space (for example, the color reproduction range of the printer 4).

Modification

The digital camera 1 and image processing apparatus 2 exchange data by using a cable. Obviously, however, they may exchange data by using a communication path such as a radio or infrared channel.

The third to sixth embodiments have exemplified the case wherein equation (1) is used as an evaluation function. However, ΔE94 represented by equation (5) may be used.

The present invention also incorporates the following arrangement within its category. In this arrangement, the program codes of software for realizing the function of the above image processing apparatus 2 are supplied to a computer (CPU or MPU) in an apparatus or system which operates various devices, thereby causing the computer in the system or apparatus to operate the respective devices in accordance with the program codes, thereby implementing the above embodiments. For example, the present invention incorporates a case wherein the above image processing is performed on driver software installed in a computer. In this case, the program codes of the above software themselves realize the functions of the embodiments. Therefore, the program codes themselves and a recording medium in which the program codes are stored to be supplied to the computer constitute the present invention.

$$\begin{vmatrix} X \\ Y \\ Z \end{vmatrix} = \begin{vmatrix} 0.7165 & 0.1010 & 0.1468 \\ 0.2587 & 0.7247 & 0.0166 \\ 0.0000 & 0.0512 & 0.7739 \end{vmatrix} \begin{vmatrix} R_{liner} \\ G_{liner} \\ B_{liner} \end{vmatrix} \times 100.0 \quad (27)$$

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Applications No. 2003-331845 filed on Sep. 24, 2003 and 2004-111034 filed on Apr. 5, 2004, which are hereby incorporated by reference herein.

What is claimed is:

1. A method of generating a multidimensional lookup table for converting image data sensed by an image sensing device, into color data of a first color space the method comprising the steps of:

inputting image data of a color patch sensed by the image sensing device;

inputting target data which represents a target color corresponding to the color patch and is represented in a second color space, different from the first color space;

displaying the sensed image data and the target data to allow for input of a user's designation for changing the target data;

changing the target data in accordance with the user's designation;

generating a color processing condition for converting the sensed image data into the color data of the first color space, wherein the color processing condition includes at least a matrix used in a matrix computation of image data so as to reduce a color difference between the target data and the color data converted from the sensed image data by color processing using the color processing condition and color space conversion from the first color space to the second color space;

displaying an evaluation value based on the color difference between the target data and the color data converted from the sensed image data by the color processing using the generated color processing condition and the color space conversion;

performing the color processing using the generated color processing condition on input color data corresponding to a plurality of grid points, which construct the multidimensional lookup table, to calculate output color data corresponding to the plurality of grid points;

storing the output color data in the multidimensional lookup table to prepare the multidimensional lookup table;

determining whether or not the output color data stored in the multidimensional lookup table is within a color gamut of the first color space; and modifying the output color data, which is determined to exist outside the color gamut, so as to move the output color data to fall within the color gamut, wherein the displaying, changing, generating, performing, storing, determining, and modifying steps are performed using an image processor.

2. A color processing apparatus for generating a multidimensional lookup table for converting image data sensed by an image sensing device into color data of a first color space, said apparatus comprising:

an inputting section, arranged to input color data of a color patch sensed by the image sensing device, and to input target data which represents a target color corresponding to the color patch and is represented in a second color space, different from the first color space;

a first displaying section, arranged to display the color data and the target data to allow for input of a user's designation for changing the target data;

a changing section, arranged to change the target data in accordance with the user's designation;

a generator, arranged to generate a color processing condition for converting the sensed image data into the color data of the first color space, wherein the color processing condition includes at least a matrix used in a matrix computation of image data so as to reduce a color difference between the target data and the color data converted from the sensed image data by color processing using the color processing condition and color space conversion from the first color space to the second color space;

a second displaying section, arranged to display an evaluation value based on the color difference between the target data and the color data converted from the sensed image data by the color processing using the generated color processing condition and the color space conversion;

a color processor, arranged to perform the color processing using the generated color processing condition on input color data corresponding to a plurality of grid points, which construct the multidimensional lookup table, to calculate output color data corresponding to the plurality of grid points;

a preparation section, arranged to store the output color data in the multidimensional lookup table by using the color processing condition;

a determiner, arranged to determine whether or not the output color data stored in the multidimensional lookup table is within a color gamut of the first color space; and a modifier, arranged to modify the output color data which is determined to exist outside the color gamut, so as to move the output color data to fall within the color gamut.

3. A non-transitory computer-readable storage medium storing a computer-executable program for causing a computer to perform a method of generating a multidimensional lookup table for converting image data sensed by an image sensing device into color data of a first color space, the method comprising the steps of:

inputting image data of a color patch sensed by the image sensing device;

inputting target data which represents a target color corresponding to the color patch and is represented in a second color space, different from the first color space;

displaying the sensed image data and the target data to allow for input of a user's designation for changing the target data;

changing the target data in accordance with the user's designation;

generating a color processing condition for converting the sensed image data into the color data of the first color space, wherein the color processing condition includes at least a matrix used in a matrix computation of image data so as to reduce a color difference between the target data and the color data converted from the sensed image data by color processing using the color processing condition and color space conversion from the first color pace to the second color space;

displaying an evaluation value based on the color difference between the target data and the color data converted from the sensed image data by the color processing using the generated color processing condition and the color space conversion;

performing the color processing using the generated color processing condition on input color data corresponding to a plurality of grid points, which construct the multidimensional lookup table, to calculate output color data corresponding to the plurality of grid points;

storing the output color data in the multidimensional lookup table to prepare the multidimensional lookup table;

determining whether or not the output color data stored in the multidimensional lookup table is within a color gamut of the first color space; and modifying the output color data, which is determined to exist outside the color gamut, so as to move the output color data to fall within the color gamut.

4. The method according claim 1, wherein said determining step determines whether or not the output color data of a grid point, which is an outermost grid point of the multidimensional lookup table and corresponds to a primary color or a secondary color, is within the color gamut.

5. The method according to claim 1, wherein in the modifying step, the movement of the output color data is performed in accordance with a user instruction.

6. The method according to claim 1, further comprising a step of outputting the multidimensional lookup table to the image sensing device.

7. The method according to claim 1, wherein the sensed image data of the color patch represents RGB color data and the first color space is a predetermined RGB color space.

* * * * *